(12) United States Patent
Ushiyama et al.

(10) Patent No.: US 8,059,561 B2
(45) Date of Patent: Nov. 15, 2011

(54) INFORMATION COMMUNICATION SYSTEM, INFORMATION COMMUNICATION METHOD, NODE DEVICE INCLUDED IN INFORMATION COMMUNICATION SYSTEM, AND RECORDING MEDIUM HAVING INFORMATION PROCESSING PROGRAM RECORDED ON IT

(75) Inventors: Kentaro Ushiyama, Nagoya (JP); Koichi Iijima, Higashikurume (JP)

(73) Assignees: Brother Kogyo Kabushiki Kaisha, Nagoya (JP); Xing Co., Nagoya (JP)

( * ) Notice: Subject to any disclaimer, the term of this patent is extended or adjusted under 35 U.S.C. 154(b) by 247 days.

(21) Appl. No.: 12/068,332

(22) Filed: Feb. 5, 2008

(65) Prior Publication Data

US 2008/0144636 A1   Jun. 19, 2008

Related U.S. Application Data

(63) Continuation-in-part of application No. PCT/JP2006/314656, filed on Jul. 25, 2006.

(30) Foreign Application Priority Data

Aug. 19, 2005  (JP) .................................. 2005-238552

(51) Int. Cl.
*H04L 12/28* (2006.01)
(52) U.S. Cl. ........................................ 370/254; 370/256
(58) Field of Classification Search .................. 370/254, 370/256
See application file for complete search history.

(56) References Cited

U.S. PATENT DOCUMENTS

| 7,184,421 | B1 * | 2/2007 | Liu et al. ........................ 370/338 |
| 2002/0178235 | A1 | 11/2002 | Ueno et al. |
| 2005/0021817 | A1 | 1/2005 | Shimizu et al. |
| 2005/0122981 | A1 * | 6/2005 | Nabae ........................ 370/395.31 |
| 2005/0135381 | A1 * | 6/2005 | Dubnicki et al. ........ 370/395.32 |
| 2005/0201405 | A1 * | 9/2005 | Liu et al. ........................ 370/432 |
| 2006/0034191 | A1 * | 2/2006 | Sahinoglu et al. ............ 370/254 |

(Continued)

FOREIGN PATENT DOCUMENTS

CN        1656749 A        8/2005

(Continued)

OTHER PUBLICATIONS

Toshio, Oka et al., "Lightweight Load Balancing for Distributed Hash Tables," Technical Report of the Institute of Electronics, Information, and Communication Engineers, vol. 103, No. 650, pp. 7-12, Feb. 5, 2004 (with English abstract).

(Continued)

*Primary Examiner* — Marsha D Banks Harold
*Assistant Examiner* — Saad Hassan
(74) *Attorney, Agent, or Firm* — Oliff & Berridge, PLC

(57) ABSTRACT

There is provided an information communication system or the like that reduces load to a node device or the like for transmitting information when information is transmitted to a plurality of node devices. In an information communication system formed by participation of a plurality of node devices, mutually connected through a communication route, a node device X determines representing node devices included in each of groups divided into a plurality of (four) groups in accordance with a predetermined rule (for example, DHT), transmits main information to node devices A, B, and C thus determined, and in a case where destination of main information received from another node device is the group the node device X belongs to, transmits the main information thus received to a node device representing a group, to which the node device X belongs.

9 Claims, 14 Drawing Sheets

U.S. PATENT DOCUMENTS

| | | | |
|---|---|---|---|
| 2006/0034193 A1* | 2/2006 | Shi et al. | 370/255 |
| 2006/0168104 A1 | 7/2006 | Shimizu et al. | |
| 2006/0268742 A1* | 11/2006 | Chu et al. | 370/254 |
| 2007/0195698 A1* | 8/2007 | Briscoe et al. | 370/235 |

FOREIGN PATENT DOCUMENTS

| | | |
|---|---|---|
| JP | A 2000-49822 | 2/2000 |
| JP | A 2000-236328 | 8/2000 |
| JP | A 2002-335281 | 11/2002 |
| JP | A 2002-344477 | 11/2002 |
| JP | A 2005-27243 | 1/2005 |
| WO | WO 03/105421 A1 | 12/2003 |
| WO | WO 2004/071032 A1 | 8/2004 |

OTHER PUBLICATIONS

Aug. 3, 2010 Office Action issued in Chinese Patent Application No. 200680029495.4 (with translation).

* cited by examiner

| 0130 | 1023 | 2203 | 3220 |
|---|---|---|---|
| IP ADDRESS 0 | – | IP ADDRESS 2 | IP ADDRESS 3 |

(B)

| 1023 | 1132 | 1202 | 1321 |
|---|---|---|---|
| – | IP ADDRESS 4 | IP ADDRESS 5 | IP ADDRESS 6 |

(C)

| 1000 | 1023 | – | – |
|---|---|---|---|
| IP ADDRESS 7 | – | – | – |

(D)

|  | FOCUS DIGIT OF EACH LEVEL 0 | FOCUS DIGIT OF EACH LEVEL 1 | FOCUS DIGIT OF EACH LEVEL 2 | FOCUS DIGIT OF EACH LEVEL 3 |
|---|---|---|---|---|
| LEVEL 1 | 0130 | 1023 | 2203 | 3220 |
|  | IP ADDRESS 0 | – | IP ADDRESS 2 | IP ADDRESS 3 |
| LEVEL 2 | 1023 | 1132 | 1202 | 1321 |
|  | – | IP ADDRESS 4 | IP ADDRESS 5 | IP ADDRESS 6 |
| LEVEL 3 | 1000 | – | 1023 | – |
|  | IP ADDRESS 7 | – | – | – |
| LEVEL 4 | – | – | – | 1023 |
|  | – | – | – | – |

FIG.5

| | | FOCUS DIGIT OF EACH LEVEL X=0 | FOCUS DIGIT OF EACH LEVEL X=1 | FOCUS DIGIT OF EACH LEVEL X=2 | FOCUS DIGIT OF EACH LEVEL X=3 |
|---|---|---|---|---|---|
| LEVEL 1 | X*** | 0132 | 1001 | 2120 | 3102 |
| | | NODE A | NODE B | NODE C | – |
| LEVEL 2 | 3X** | 3001 | 3102 | 3232 | 3311 |
| | | NODE D | – | NODE E | NODE F |
| LEVEL 3 | 31X* | 3102 | – | 3123 | 3130 |
| | | – | – | NODE G | NODE H |
| LEVEL 4 | 310X | – | – | 3102 | 3103 |
| | | – | – | – | NODE I |

FIG.6

PACKET

| HEADER PART | | MAIN INFORMATION |
|---|---|---|
| TARGET NODE ID | ID MASK | |

(A)

| HEADER PART | | MAIN INFORMATION |
|---|---|---|
| 2132 | 4 | |

(B)

| HEADER PART | | MAIN INFORMATION |
|---|---|---|
| 3301 | 2 | |

(C)

| HEADER PART | | MAIN INFORMATION |
|---|---|---|
| 1220 | 0 | |

(D)

FIG.7
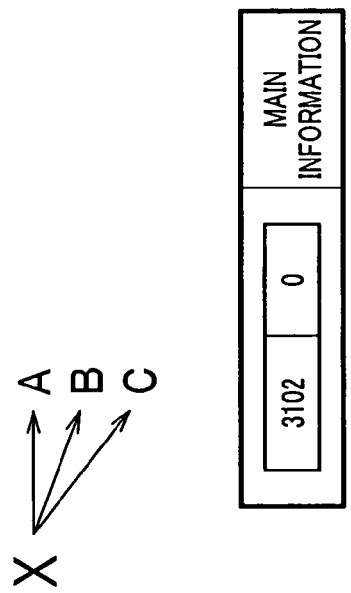
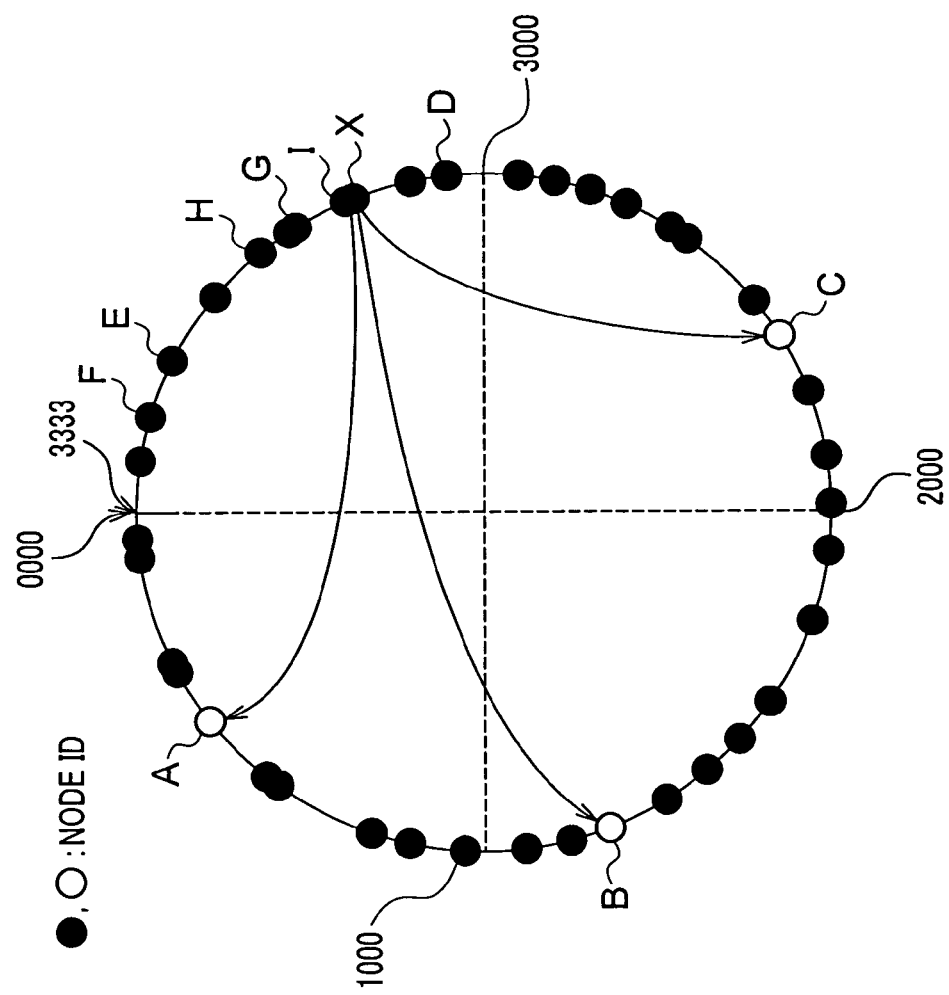

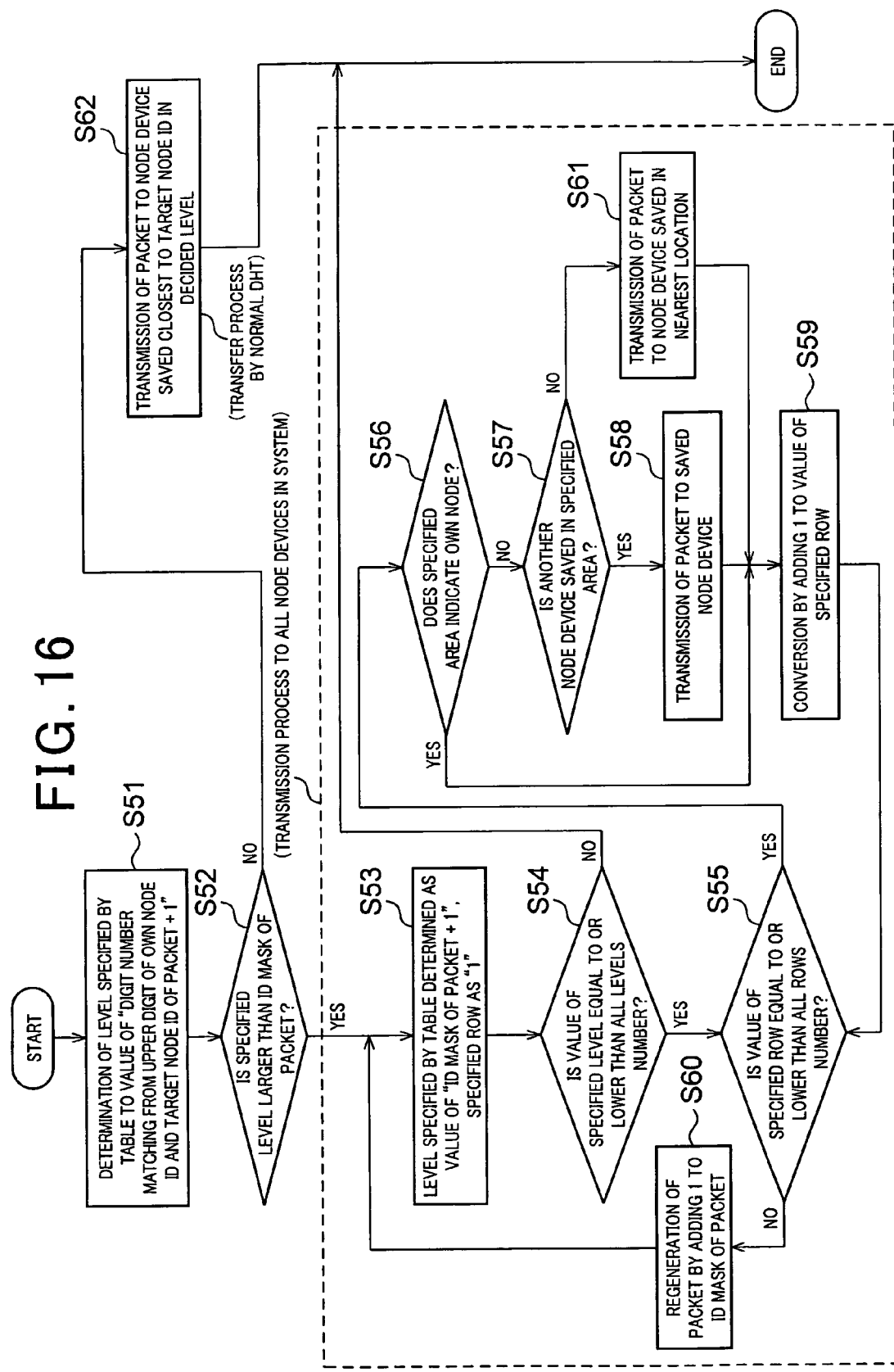

ical field of information communication system and a method of a peer to peer (P2P) type, including a plurality of node devices, which are mutually connected through a network.

INFORMATION COMMUNICATION SYSTEM, INFORMATION COMMUNICATION METHOD, NODE DEVICE INCLUDED IN INFORMATION COMMUNICATION SYSTEM, AND RECORDING MEDIUM HAVING INFORMATION PROCESSING PROGRAM RECORDED ON IT

CROSS REFERENCE TO RELATED APPLICATION

This is a Continuation-in-Part of Application No. PCT/JP2006/314656 filed Jul. 25, 2006, which claims the benefit of Japanese Application No. 2005-238552 filed Aug. 19, 2005. The disclosures of the prior applications are hereby incorporated by reference herein in their entirety.

BACKGROUND OF THE INVENTION

1. Field of the Invention

The present invention relates to a technical field of information communication system and a method of a peer to peer (P2P) type, including a plurality of node devices, which are mutually connected through a network.

2. Discussion of Related Art

When identical information is transmitted to a plurality of terminal apparatuses, belonging to a network, a terminal apparatus on a sending side produces copies of the information as many as number of the terminal devices on the receiving side, and the information thus copied is sent to the terminal devices.

Further, there is known a technique (IP multicast) that a router corresponding to such a plurality of transmission destination terminal devices is intervened, and one information transmitted by the terminal device for transmitting information is copied at a branch point of a destination by the router, and such the information is transmitted to the plurality of terminal devices (vide, for example, Patent Document 1). This technique reduces load of a terminal device which transmits information.

In addition, there is a known technique by which terminal devices are divided into groups, a group management server is provided to each group, and information one by one is transmitted to each group so that the information is transmitted to all the terminal devices, belonging to each of the groups (vide, for example, Patent Document 2).

Meanwhile, a technique called peer to peer is attracting attention in recent years. In the peer to peer information delivery system, for example, in an overlay network which is logically configured by use of a delivered hash table (hereinafter referred to as DHT), each of node devices participating in the overlay network does not recognize link information (for example, IP address) of all the node devices, but retains only part of link information obtained on participation or the like, and data inquiry or the like is performed on the basis of such the link information.

In an overlay network thus structured, it is necessary that delivery of load is appropriately shared even when participation and withdrawal of node devices occur often. Non-patent Document 1 discloses a technique that enables to appropriately share load even when participation and withdrawal often occur.

Patent Document 1: Japanese Unexamined Patent Publication No. 2000-49822

Patent Document 2: Japanese Unexamined Patent Publication No. 2002-344477 (FIG. 9)

Non-patent Document 1: T. Oka, H. Morikawa, and Y. Aoyama, "Lightweight Load Balancing for Distributed Hash Tables", Technical Report of the Institute of Electronics, Information, and Communication Engineers Feb. 5, 2004, No. 103 issue, No. 650, p. 7-12

SUMMARY OF THE INVENTION

However, in an aspect in which a terminal device transmitting information makes copies of the information by, when there are significantly many terminal devices, communication traffic is increased, as well as load of the terminal device transmitting the information is increased.

Moreover, in a case where information is transmitted by use of a special router which can produce a copy of information on a communication route, though it is not necessary for the terminal device to produce a copy of the transmitted information, there is an inconvenience that all the routers on a communication route through which the information is transmitted must correspond to the above-mentioned function (IP multicast function).

In addition, when a management server for a group is used, the management server bears a load of managing terminal devices belonging to the group, and also there is generated a load in managing the entire system by providing a management server to each group.

The present invention is provided in consideration of the above problems, and the object of the present invention is to provide a peer to peer information communication system including a plurality of node devices, mutually connected through a network, and a method thereof, wherein when one node device transmits information to other plurality of node devices (so-called multicast communication), the above-mentioned problems are solved, and load on the node device that transmits information or the like is reduced.

To solve the above problems, according to an invention of claim 1, there is provided an information communication system formed by participation of a plurality of node devices mutually connected through a communication route, and one node device included in the plurality of node devices includes an information transmission means for determining one node device included in each of a plurality of groups divided in conformity with a predetermined rule and for transmitting main information to be transmitted to all the node devices thus determined, and an information transfer means for determining the one node device included in each of groups further divided in conformity with the predetermined rule when destination of the main information thus received from the other node device is a group including the own node device and for transmitting the main information thus received to all the node devices thus determined.

According to the above, in the information communication system, one node device transmits main information (for example, update information (program) for updating a program, various types of information such as text information including a message) to one node device included in a group, to which the one node device wants to transmit the main information, the node device being a representative of the group, and the node device receiving the main information transfers the main information to a node device, which represents a group, in a case where the destination of the main information thus received is a group including the own node device. Therefore, when a node device transmits main information to a plurality of node devices, a router or a management server is not required thereby simplifying configuration of the entire system and also reducing a load on a node device that transmits main information or the like. Moreover, by determining a group, to which main information is transmitted by a node device, an identical main information can be transmitted only to the group thus determined or to all the node devices in all the groups.

According to the present invention, when a node device transmits information to a plurality of node devices, a router or a management server is not required, an entire system can be simplified, and load on a node device or the like, which transmits information can be reduced. Further, by previously determining a group, to which the node device transmits information, it is possible to transmit identical information to all the node devices in the group only or in all of the groups.

BRIEF DESCRIPTION OF THE DRAWINGS

FIG. 3(A) is an example of table in level 1.

FIG. 3(B) is an example of a table in level 2.

FIG. 3(C) is an example of a table in level 3.

FIG. 3(D) is an example of a complete routing table.

FIG. 5 is an example of a routing table retained by a node X used for every embodiments.

FIG. 6(A) to (D) are views schematically showing a generated packet.

FIGS. 7(A) and 7(B) are views showing a first stage in transmitting a packet.

FIG. 16 is a flowchart showing a packet transmission process in node device 1 according to the second embodiment.

DETAILED DESCRIPTION OF THE PREFERRED EMBODIMENTS

Figure 1:
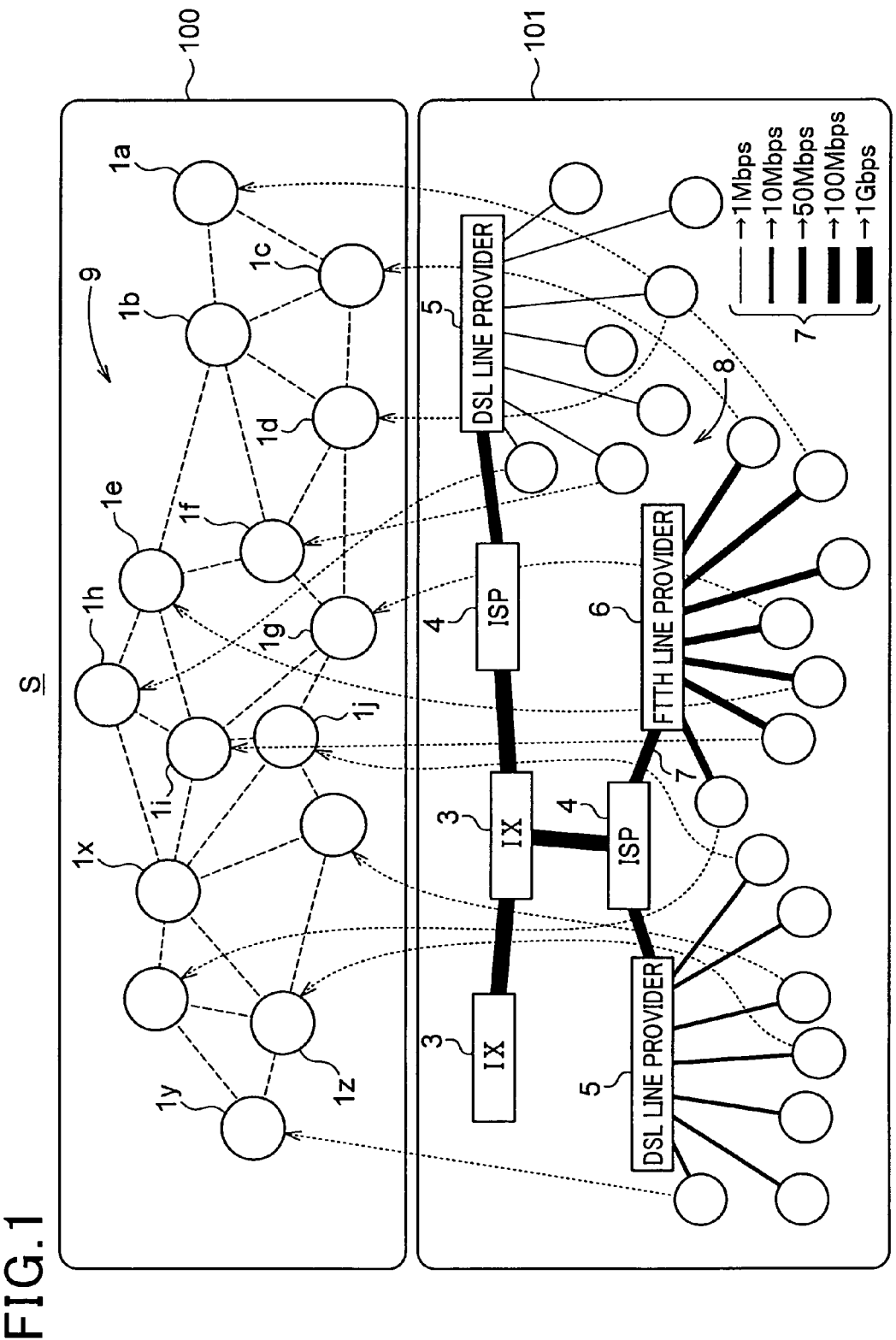
FIG. 1 is A view showing an example of a connection status of each node device in an information communication system according to the present embodiment.

Hereinafter, each designation of numerical reference in the drawings is typically as follows:
1: node device;
2: network;
9: overlay network;
11: control unit;
12: storage unit;
13: buffer memory;
14: decoder;
15: image processing unit;
16: display unit;
17: audio processing unit;
18: speaker;
20: communication unit;
21: input unit;
22: bus, and
S: information communication system Hereafter, a best mode for carrying out the present invention will be described in reference of figures. Here, embodiments explained below are embodiments when the present invention is applied to an information communication system for transmitting main information to all the node devices by use of a DHT, transmission destination group specification value (ID mask) and identification information (target ID).

[1. Configuration and the Like of Information Communication System]

First, a general configuration and the like of an information communication system will be explained with reference to FIG. 1. FIG. 1 shows an example of connection status of each of node devices in an information communication system according to the present embodiment.

As shown in a lower rectangular frame 101 of FIG. 1, a network 8 (network in real world) of the Internet or the like is configured by an internet exchange (IX) 3, internet service provider (ISP) 4, digital subscriber line provider (or their device) 5, fiber to home line provider ('s device) 6, and communication line (for example, such as a telephone line and an optical cable) 7 and the like.

An information communication S is configured by a plurality of node devices $1a$, $1b$, $1c$ . . . $1x$, $1y$, $1z$ . . . which are connected with each other via such the network 8 as a communication means and is a peer to peer network system. Moreover, to each of the node devices $1a$, $1b$, $1c$ . . . $1x$, $1y$, $1z$ . . . , unique manufacturing number and internet protocol (IP) address have been respectively assigned as information indicative of a node device. None of manufacturing number and IP address overlaps in a plurality of node devices 1. In the explanation below, any one of the node devices $1a$, $1b$, $1c$ . . . $1x$, $1y$, $1z$ . . . will be referred to as a "node 1" for the convenience of explanation.

[1.1 Overview of 1-1 DHT]

Hereafter, an algorithm using a distributed hash table (hereinafter referred to as DHT) according to the present embodiment will be described.

In the above-mentioned content delivery system S, when the node device 1 accesses information included in another node device 1, it is required for the node device 1 to know IP address of the counterpart as node information.

For example, in a system with its contents are shared each other, it is a simple measure for each node device 1 to know IP addresses of all the node devices, participating in the network 8. However, when there are tens or hundreds of thousand of terminals, it is not realistic to memorize the IP addresses of all the node devices 1. Moreover, when power to an arbitrary node device is thrown in or out, it is required for each of the node devices 1 to frequently update IP address of the arbitrary node device, and therefore it becomes difficult to operate the system.

Therefore, there is devised a system where one node device 1 memorizes (saves) least necessary IP addresses of node devices 1 among all the node devices, and information is transferred between each of the node devices 1 for a node device 1 with its IP address unknown (not saved).

As an example of such a system, an overlay network 9 shown in the upper rectangular frame 100 of FIG. 1 is configured by an algorithm using DHT. In other words, the overlay network 9 means a network that configures a virtual network, formed by using an existing network 8.

In the present embodiment, an overlay network 9 configured by an algorithm using DHT is used as prerequisite. The node device 1 provided on this overlay network 9 is called a node device 1, participating in the information communication system S (in other words, participating in the overlay network 9). Meanwhile, participation into the information communication system S is performed when a node device, which has not participated yet, sends participation request to an arbitrarily selected node device 1, already participated therein.

A unique (inherent) number is attached to a node device 1 participating in the information communication system S as node ID (identification information) of each node device. The number is required to have a bit number which can contain upper limit number of devices that the node device can operate. For example, when the number is a 128-bit number, the node device can operate $2^{128}=340\times10^{36}$ node devices.

More specifically, a node ID of each node device 1 is a hash value, obtained by hashing a unique number of each node device such as an IP address or a manufacturing number with a common hash function (hash algorithm), and is distributed and located in one ID space without deviation. As such, each of the (hashed) node IDs obtained with a common hash function (hashed) in such a manner has an extremely low possibility of generating an identical value when the IP address or the manufacturing number differs from each other. Since such a hash function is known, detailed explanation thereof is omitted. Furthermore, in the present embodiment, a node ID is obtained by hashing an IP address (global IP address) with a common hash function.

[1-2. Creation of a Routing Table]

Figure 2:
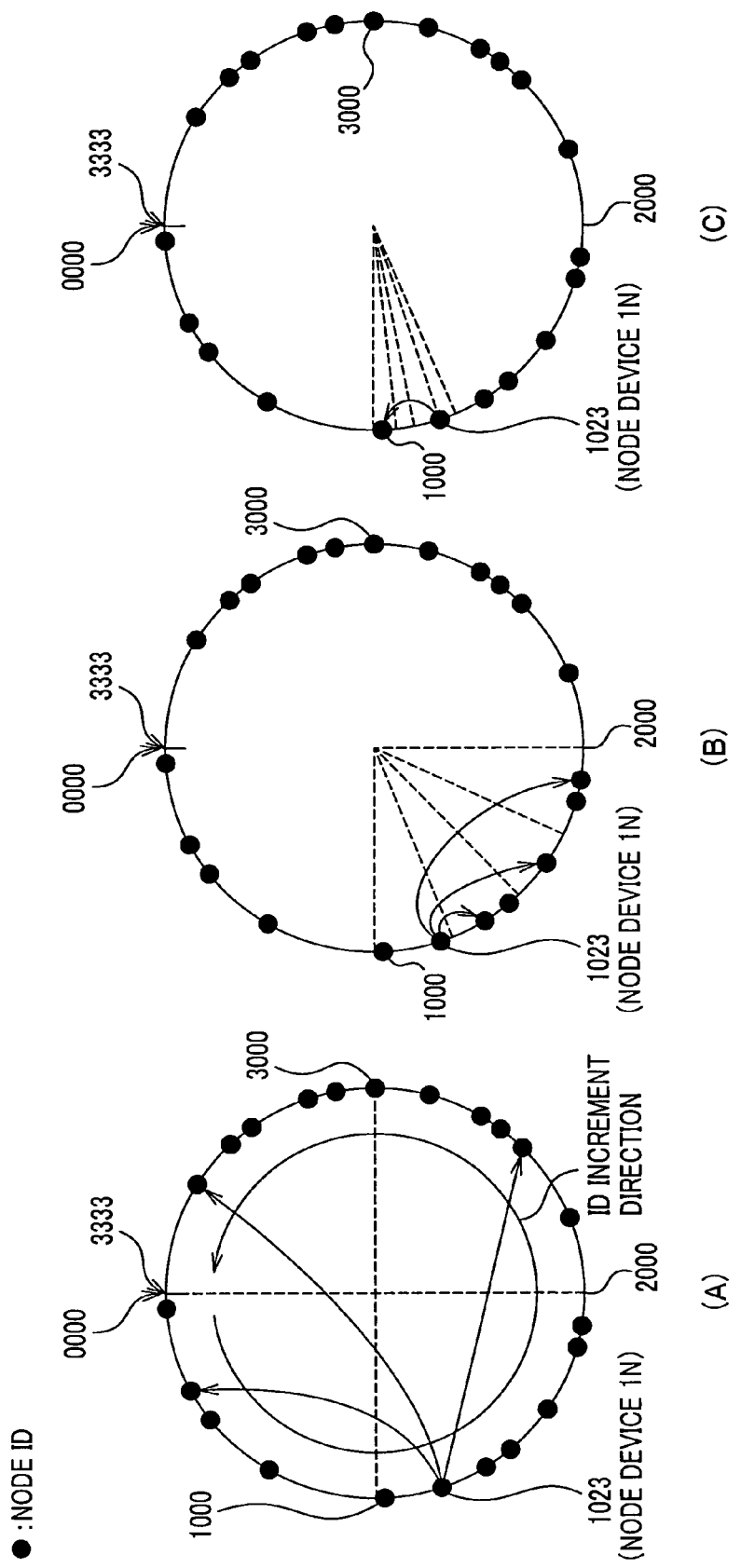
FIG. 2 is a view showing an example of how an ID space and a routing table are made by a DHT.

Here, an example of creation method of a routing table used in DHT is explained with reference to FIG. 2. FIG. 2 is a view showing an example where a routing table is created by DHT.

Because the node ID given to each of node devices 1 is generated by a common hash function, as shown in FIGS. 2(A) to (C), it is supposed that the node IDs are dispersed and exist in the same ring-shaped ID space without deviation. The figures show a case where a node ID is given with 8 bit. In the figures, a black spot designates a node ID, and ID is increased in the counterclockwise direction.

First, as shown in FIG. 2(A), an ID space is divided into several areas. Practically, though an ID space is frequently divided into 16 areas, for the convenience of explanation, here the space is divided into four, and an ID is expressed by quaternary number having a bit length of 16-bit. Further, explanation is given to a case where an example that a node ID of a node device 1N is "1023" and a routing table of the node device 1N is created.

(Routing in Level 1)

First, when the ID space is divided into four, there are four areas where its upper limit digit number differ from each other when expressed by quaternary number, such as "0XXXXXXX", "1XXX", "2XXX", and "3XXX" (here, "X" is any of natural number from 0 to 3 and the same is applied hereinafter). Since the node ID of the node device 1N is "1023", the node device 1N exists in left lower area of "1XXX" in the figure. Then, the node device 1N randomly selects a node device 1 existing in an area other than the area where the node device 1N exists (that is, an area other than "1XXX"), and saves an IP address of the node device in a table of level 1. FIG. 3(A) is an example of a table of level 1. The second raw indicates the own node device 1N, and therefore it is unnecessary to save the IP address.

(Routing in Level 2)

Next, as shown in FIG. 2(B), among four areas obtained by dividing using the above routing, an area where the node device 1N exists is further divided into four to thereby further obtain four areas, "10XX", "11XX", "12XX", and "13XX". Then, in a manner similar to the above, a node device 1 existing in an area where the node device 1N does not exist is properly selected, and an IP address of the node ID is saved in a table of level 2. FIG. 3(B) is an example of a table in level 2. The first raw indicates the node device 1N and therefore it is not necessary to save the IP address.

(Routing in Level 3)

Further, as shown in FIG. 2(C), among four areas obtained by division using the above routing, an area where the node device 1N exists is further divided into four to make four more areas, "100X", "101X", "102X", and "103X". Then, in a manner similar to the above, a node device 1 existing in an area where the node device 1N does not exist is properly selected, and an IP address of the node device is saved in a table in level 3. FIG. 3(C) is an example of a table in level 3. The third raw indicates the node device 1N, and therefore it is unnecessary to save the IP address thereof and the second and fourth rows are left blank because there exists no node devices in these areas.

As such, by making the routing table up to the level 4 as shown in FIG. 3(D), the all IDs of 8 bit are completely covered. The higher the level becomes, the more blank spaces appear in the table.

The routing tables made in accordance with the method explained above are respectively created and possessed by all the node devices 1. Thus, the node device 1 memorizes IP addresses of other node devices as destination information and an area in a node ID space as a group and/or a group brigade, in other words, each level and each row of a DHT, in association with these each other.

Here, number of levels is determined depending on the digit number of a node ID and number of attention digit is determined depending on the number of dyadic number. Specifically, in case of 16-digit hexadecimal, ID has 64-bit and (alpha-) numeral in the attention digit in level 16 is 0 to f. In a later described explanation of a routing table, a part indicative of a number of a number of an attention digit of each level is simply referred to as a "row".

[2. Configuration and the Like of a Node Device]

Next, configuration and function of a node device 1 will be described with reference to FIG. 4. Here, the node device 1 functions as a node device 1 for transmitting main information first, a node device 1 for transferring the received main information, and the like, depending on process performed by each node. However, configuration of the node devices 1 is the same.

Figure 4:
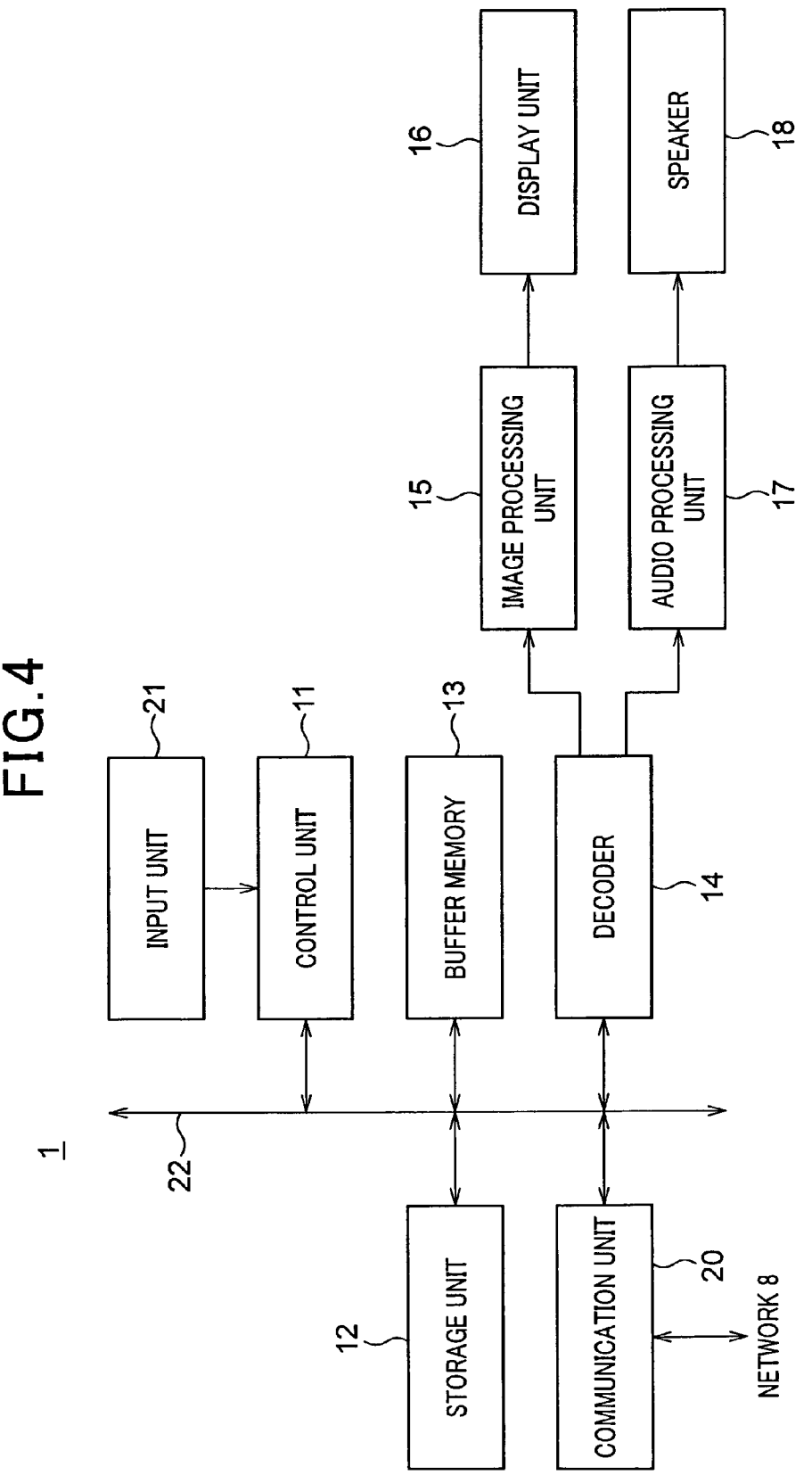
FIG. 4 is a view showing a schematic configuration of a node device 1.

FIG. 4 is a view for showing schematic configuration of the node device 1.

Each of the node devices 1 is configured by including, as shown in FIG. 4, a control unit 11 which is a computer configured by having a CPU having computing function, a RAM for work, and a ROM for storing various data and programs, a storage unit 12 configured by an HD or the like for saving and memorizing (storing) various data (for example, content data, location information, and DHT), a buffer memory 13 for temporarily storing received content data, a decoder unit 14 for decoding (stretching data or decrypt) encoded video data (image information) and audio data (voice information) included in the content data, an image processing unit 15 for performing predetermined graphic processing to the decoded video data or the like to output the data as video signal, a display unit 16 such as CRT or liquid crystal display for displaying image based on the video signal outputted from the image processing unit 15, an audio processing unit 17 for converting the decoded audio data by digital/analog (D/A) conversion into analog audio signal and thereafter amplifying the converted signal by an amplifier to output, a speaker 18 for outputting the audio signal outputted from the audio processing unit 17 as acoustic wave, a communication unit 20 for performing communication control of information with respect to the other node device 1 via the network 8, and an input unit 21 which receives an instruction signal from a user and provides the instruction signal corresponding to the instruction to the control unit 11 (for example, such as a key board, a mouse, or an operation panel) and the control unit 11, the storage unit 12, the buffer memory 13, the decoder 14, and the communication unit 20 are connected with each other via a bus 22.

Then, when CPU in the control unit 11 runs various programs saved in the storage unit 12 or the like (including a computer program of the present invention), the control unit 11 of the node device 1 controls the entire node device 1, and carries out a content data registration process or the like, in response to an instruction signal from the input unit 21. The node device 1 functions as a node device for transmitting original main information, a node device for receiving and transferring the main information, or the like. Specifically, the control unit 11 of a node device 1 functions as an information transmission means, an information transfer means, a processing means, and a transfer number limiting means.

[3. Overview of Information Communication System]

Figure 8:
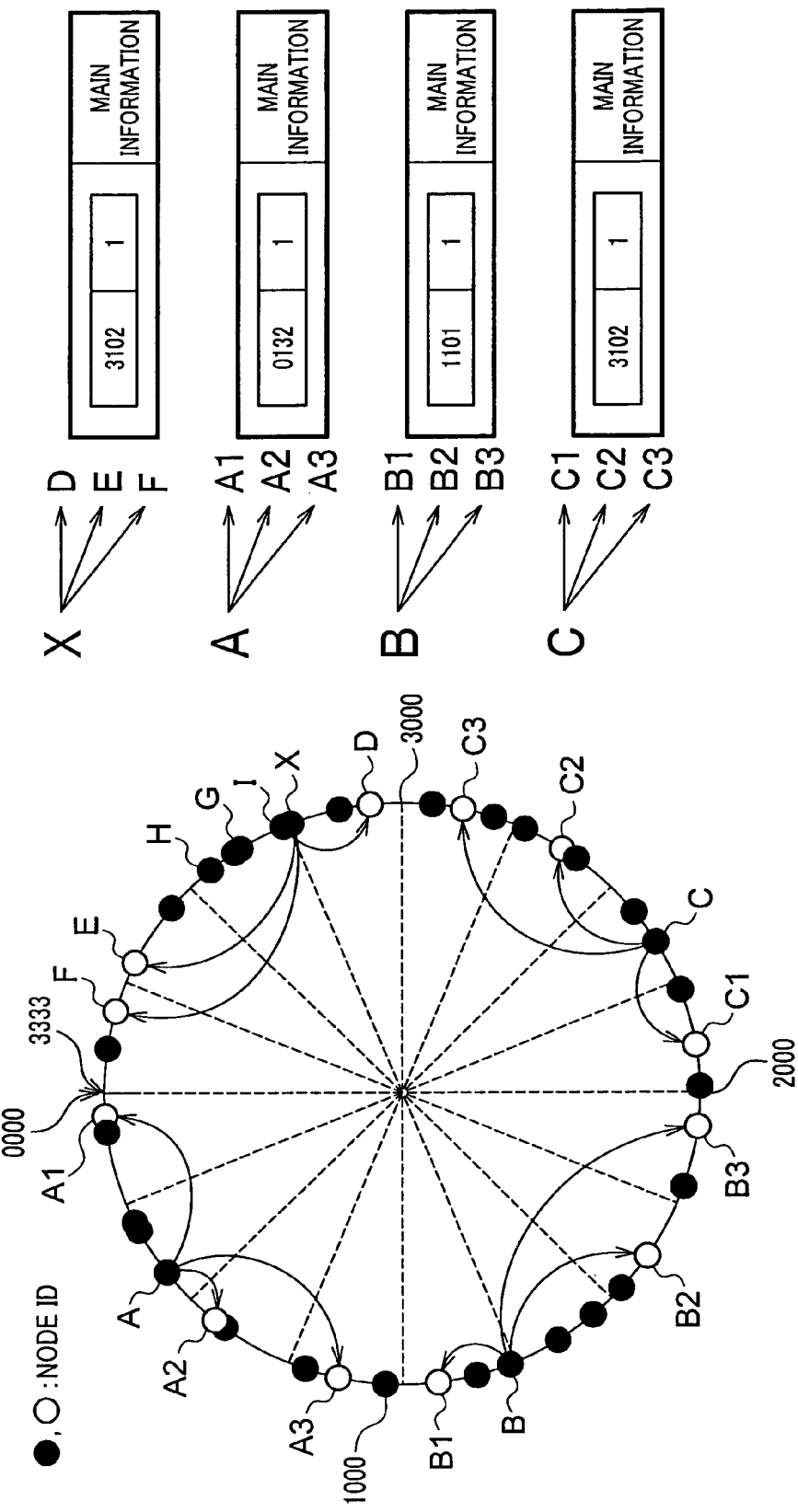
FIGS. 8(A) and 8(B) are views showing a second stage in transmitting a packet.
Figure 9:
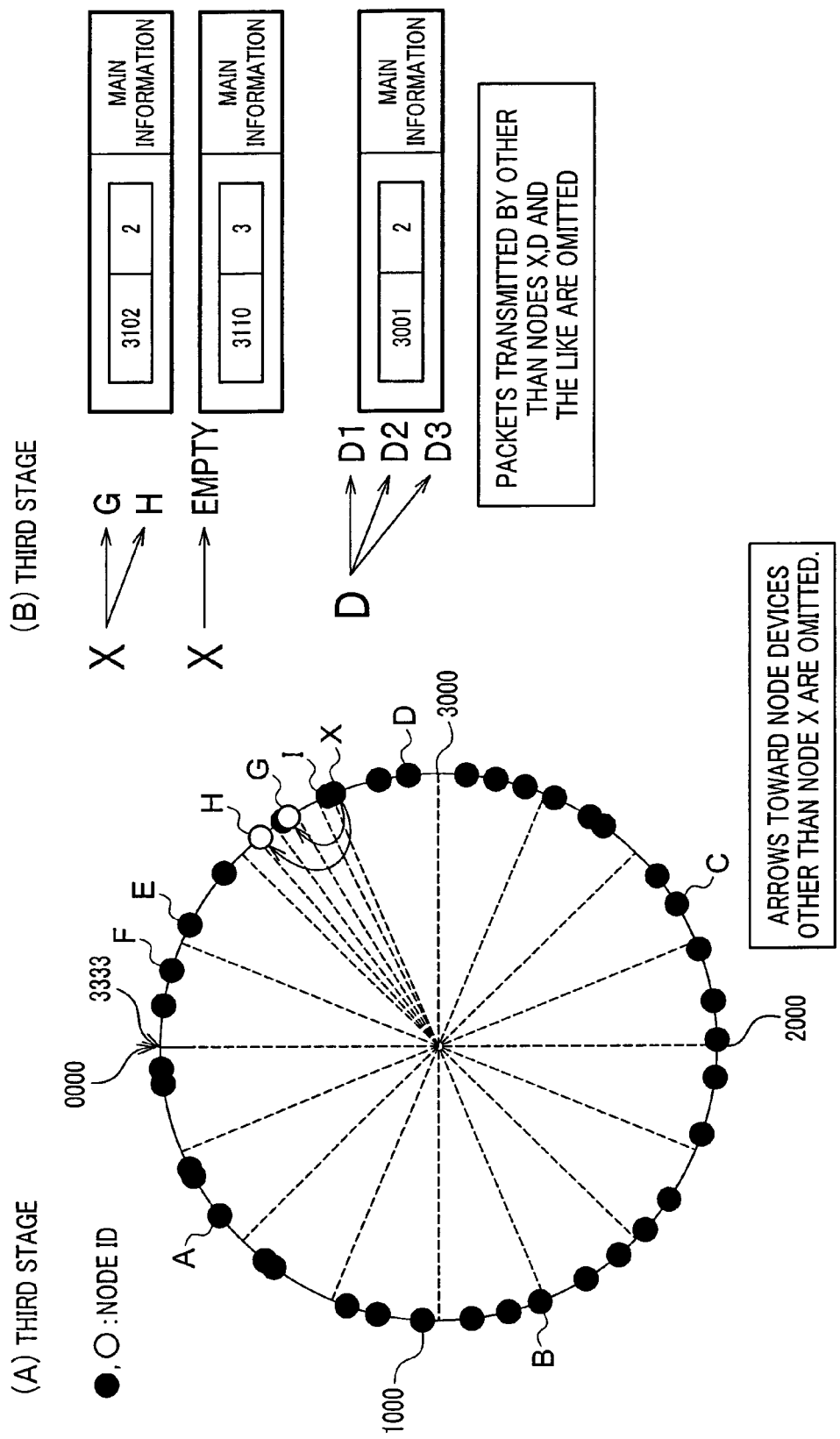
FIGS. 9(A) and 9(B) are views showing a third stage in transmitting a packet.
Figure 10:
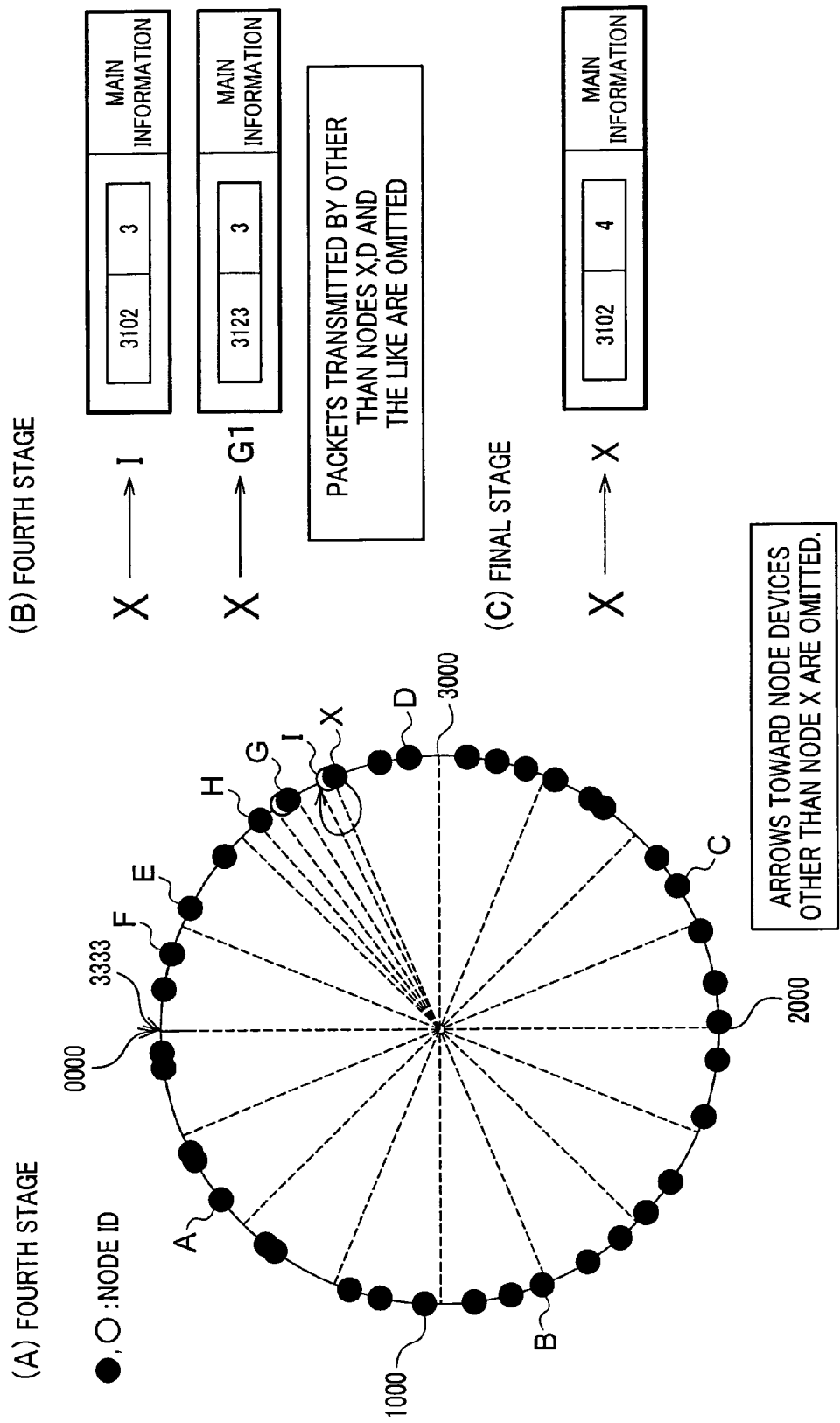
FIGS. 10(A) and 10(B) are views showing a fourth stage in transmitting a packet.
FIG. 10(C) is a view showing a final stage in transmitting a packet.

An information communication system S of the present embodiment will be described. According to an information communication system S of the present embodiment, one node device 1 transmits main information to all the node devices 1 in the system S or to a node device 1 of a specific group. Specifically, the one node device 1 (X) determines each of the node devices 1 representing each group (a node device saving IP address), obtained by dividing a node ID space into a plurality of numbers, and transmits main information to the node device 1 (vide later-described FIGS. 7 to 10). Then, each of node devices 1 receiving the main information designates each of node devices 1, which represents each group obtained by dividing a node ID space (group), to which the own node device belongs, into a plurality of numbers to thereby transmit (transfer) the main information to the node devices 1 (vide later-described FIGS. 8 to 10). Here, a node ID space (group), to which each of the node device 1 belongs, and is divided into a plurality of numbers by the node devices 1 receiving the main information designates a group corresponding to the group where a node device on a transmission side transmits the main information to its representative. When each of node devices 1 carries out such an operation, it is possible to transmit the main information to all the node devices belonging to the information communication system S.

[3. Operation of Information Communication System of First Embodiment]

Next, operation of the information communication system S of the first embodiment will be explained with reference to FIGS. 5 to 12.

[3.1.1 Operation of Information Communication System in its Entirety]

Hereinafter, operation of the entire information communication system S of the first embodiment will be described with reference to FIGS. 5 to 10.

There are premises that one node device 1 is supposed to be a node X, and the node X retains a routing table of 4-character quaternary number shown in FIG. 5. As shown in the routing table, IP addresses of nodes A to I, belonging to a group of a group brigade in any of levels 1 to 4, are saved by the node X.

The node X transmits main information. As shown in FIG. 6(A), in a header part of the main information, a target node ID as identification information and an ID mask as a transmission group specification value are included. Hereinafter, as shown in FIG. 6(A), information including main information and a header part is referred to as a packet.

A target node ID is 4-character quaternary number similar to the node ID. When the node X transmits main information to all other node devices 1, a target node ID added by the node X may be any ID, as described later. However, a node ID of the own node device is normally set to be the target node ID. Moreover, a target node ID added by a node device 1, which is to transfer main information, is set to be a node ID of the own node device. In addition, when main information is transmitted to one node device 1, a node ID corresponding to a node device 1, which is a transmission destination, is set to be a target node ID.

An ID mask is provided for specifying valid digit number of the target node ID and by the valid character number, a node ID which is common for the valid digit number from the top of the target node ID is indicated. Due to such a characteristic of an IDmask, in the present embodiment, value of the ID mask is 0 to 4, and when digit number of a routing table differs, the value is an integer of 0 or more and equal to or less than upper limit digit number of the routing table. By an ID mask added to main information, information is transmitted to each of node devices 1 registered in a level of ID mask value+1 in a routing table.

Next, combination of a target node ID and an ID mask will be explained.

For example, as shown in FIG. 6(B), when a target node ID is "2132" and an ID mask is "4", all "4" characters of the target node ID are valid and a packet is transmitted only to a node device 1 having node ID is "2132".

Moreover, as shown in FIG. 6(C), when a target node ID is "3301" and an ID mask is "2", top "2" of the target node ID is valid and a packet is transmitted only to a node device 1 having a node ID of "33**" and top two characters are "33".

In addition, as shown in FIG. 6(D), when a target node ID is "1220" and an ID mask is "0", top "0" character of the target node ID is valid, that is, none of characters is valid and a packet including main information is transmitted to all the node devices 1 in the system S of which node ID is "****". Therefore, a target node ID at this time may be any value.

Furthermore, although it is not described in detail, node ID, IP address, and the like, which are information normally included in a packet, of the node X on a transmitting side are also included in the header part of main information, included in a packet.

Next, by use of FIGS. 7 to 10, transmission and transfer operation of main information using a target node ID and an ID mask will be explained.

(First Stage)

First, because the node X wishes to transmit main information to all the node devices 1 participating in the information communication system S, the node X adds a node ID "3102" of the node X to the header part of the main information as a target node ID, and adds "0" value as an ID mask to generate a packet. Then, as shown in FIGS. 7(A) and (B), the node X refers to a routing table in FIG. 5 and transmits a packet to each of node devices 1 (nodes A, B, and C), belonging to a group in level "1", which is a value obtained by adding 1 to the ID mask value "0".

(Second Stage)

Next, the node X converts the ID mask value "0", added to the transmitted packet, into "1", and adds the ID mask thus converted to main information to thereby generate a packet. In this case, because target node ID is the node ID of the node X, the target node ID is not changed. Then, the node X refers to a routing table in FIG. 5. As shown in a right upper part of a node ID space in FIGS. 8(A) and (B), the node X transmits a packet thus generated to each of node devices 1 (nodes G, H) belonging to a group in level "2", which is a value obtained by adding 1 to the ID mask value "1".

Then, the node A which receives a packet from the node X in the second stage converts the ID mask value "0" added to main information of the packet to "1", and adds the ID mask thus converted to the main information to generate a packet. Moreover, the node A converts the target node ID "3102" to "0132" which is a node ID of the node A, adds the target node ID thus converted to the main information to generate a packet. Then, the node A refers to a routing table of the node A (not shown), and as shown in left upper part of a node ID space in FIGS. 8(A) and (B), the node X transmits the packet thus generated to each of node devices 1 (nodes A1, A2, and A3) belonging to a group in level "2", which is a value obtained by adding 1 to the ID mask value "1".

In a manner similar thereto, as shown in left lower and right lower parts of a node ID space in FIGS. 8(A) and (B), the nodes B and C receiving a packet from the node X in the first stage adds ID mask "1" and node ID of the nodes B and C as target node IDs to main information in order to generate a packet according to routing tables, retained by nodes B and C respectively, and transmits the packet thus generated to each of node devices 1 (nodes B1, B2, B3, C1, C2, and C3) belonging to a group in level "2".

(Third Stage)

Next, the node X converts the ID mask value "1" added to the transmitted packet to "2", and adds the ID mask thus converted to main information to generate a packet. In this case, because target node ID is the node ID of the node X the target node ID is not changed. Then, the node X refers to a routing table in FIG. 5, and as shown in right upper part of a node ID space in FIGS. 9(A) and (B), the node X transmits the packet thus generated to each of node devices 1 (nodes D, E, and F) belonging to a group in level "3", which is a value obtained by adding 1 to the ID mask value "2".

Then, the node G receiving a packet from the node X in the third stage converts the ID mask value "2" to "3", obtained by adding 1 thereto, and adds the ID mask thus converted to the main information to generate a packet. Moreover, the node A converts the target node ID "3102" to "3001", which is a node ID of the node D, adds the target node ID thus converted to the main information in order to generate a packet. Then, the node G refers to a routing table of the node D (not shown) and as shown in FIG. 9(B), the node D transmits the packet thus generated to each of node devices 1 (nodes D1, D2, and D3) belonging to a group in level "3", which is a value obtained by adding 1 to the ID mask value "2" (not shown in the node ID space in FIG. 9(A)).

In a manner similar thereto, although it is not shown, the nodes E, F, A1, A2, A3, B1, B2, B3, C1, C2, and C3 receiving a packet in the second stage also adds an ID mask "2" and a node ID of each of the node devices as a target node ID to main information in accordance with a routing table retained by each of the nodes, to thereby generate a packet and transmit the packet to each node devices 1 belonging to a group of level 3.

(Fourth Stage)

Next, the node X converts the ID mask value "2" added to the transmitted packet to "3", and adds the ID mask thus converted to main information to thereby generate a packet. In this case, because the target node ID is the node ID of the own node device, the target node ID is not changed. Then, the node X refers to a routing table in FIG. 5, and as shown in a right upper part of a node ID space in FIGS. 10(A) and (B), the node X transmits the packet thus generated to a node device 1 (node 1) belonging to a group in level "4", being a value obtained by adding 1 to the ID mask value "3".

Then, the node G receiving a packet from the node X in the third stage converts the ID mask value "2", added to main information of the packet to "3", and adds the ID mask thus converted to the main information to thereby generate a packet. Moreover, the node G converts the target node ID "3102" to "3123", which is a node ID of the own node device, adds the target node ID thus converted to the main information to thereby generate a packet. Then, the node G refers to a routing table of the node D (not shown) and, as shown in FIG. 10(B), the node D transmits the packet thus generated to each of node devices 1 (it is supposed that IP address of a node G1 is saved) belonging to a group in level "4", which is a value obtained by adding 1 to the ID mask value "3" (not shown in the node ID space in FIG. 10(A)).

In a manner similar thereto, though it is not shown, each of node devices 1 receiving a packet from the nodes E, F, A1, A2, A3, B1, B2, B3, C1, C2, and C3 in the third stage also adds an ID mask "3" and node ID of each of the node devices as a target node ID to main information in accordance with a routing table, retained by each of the nodes, to thereby generate a packet, and transmits the packet to each node devices 1 belonging to a group in level 4.

(Final Stage)

Next, the node X converts the ID mask value "3" added to the transmitted packet to "4", and adds the ID mask thus converted to main information to thereby generate a packet. In this case, because a target node ID is the node ID of the own node device, the target node ID is not changed. Then, as shown in FIG. 10(C), the node X recognizes that the packet is transmitted to the own node device from the target node ID and the ID mask and finishes transmission process.

Also, each of node devices 1 receiving a packet from each of node devices 1 including the node X in the fourth stage converts the ID mask value "3", added to main information of the packet thus received, into "4", and adds the ID mask thus converted to main information to thereby generate a packet. Moreover, each of the node devices 1 converts the target node ID to node ID of the node device 1, and adds the target node ID thus converted into main information to thereby generate a packet. Therefore, from the target node ID and the ID mask, the node device 1 recognizes that the packet is transmitted to the node device 1 and finishes the transmission process.

Here, because the node X transmits to let all the node devices 1, included in the information communication system S, know main information, each of node devices 1 which received the packet performs process corresponding to the main information. For example, the when main information is text information which is a message, a process to display an image showing the message on the display unit 16 is performed and when main information is update information of a program, process to update the program is performed.

[3.1.2. Operation of Node Device]

Next, (1) a process performed in one node device 1 (above-mentioned node X) when the node X tries to transmit main information to all the node devices 1 in the system S (hereinafter referred to as information transmission process), and (2) a process performed by another node device which received a packet including the main information from the node X (for example, the above-mentioned node A) will be explained (hereinafter referred to as information transfer process) in detail by use of FIGS. 11 and 12.

(1) Information Transmission Process

An information transmission process of the node X will be explained with reference to FIG. 11. Here, it is supposed that the node X retains (saves) a routing table shown in FIG. 5, as mentioned above.

The control unit 11 of the node X starts the information transmission process when an instruction from the input unit 21, communication unit 20, or the like for transmitting certain information to all the node devices 1, belonging to the information communication system S, is received, on a premise that the node X is working (in other words, power is turned on and various settings of the node X is initialized) (start).

When the information transmission process is started, the control unit 11 generates a packet (Step S1). Specifically, the control unit 11 sets the target node ID of the packet to "3102", which is the node ID of the node X, sets the IDmask of the packet to "0", and sets main information of a packet to be information required to be transmitted to thereby generate a packet.

Next, the control unit 11 judges whether or not the an ID mask of the packet is smaller than the digit number of the routing table (digit number and all level number of the node ID) (Step S2). At this time, since the ID mask "0" is smaller than the digit number of the routing table "4", the control unit 11 judges that the ID mask of the packet is smaller than the digit number of the routing table (Step S2: YES), and transmits the packet thus generated to all the node devices 1 registered in a routing table level "ID mask of a packet+1" (Step S3): Specifically, the packet is transmitted to nodes A, B, and C, which are node devices 1 in a stage of level 1 having an ID mask "0"+1.

Next, the control unit 11 converts the ID mask of the packet to a value of "ID mask of the packet+1" (Step S4). Specifically, the control unit 11 converts the value to "1", which is obtained by adding 1 to the ID mask of the packet "0", in order to regenerate the packet. Subsequently, the process returns to the above-mentioned Step S2.

Then, the control unit 11 repeats Steps S2, S3, and S4 for ID masks "1", "2", and "3" in a manner similar thereto, and transmits the packet to nodes D, E, F, G, H, and I, saved in the routing table. Thus, it becomes possible to transmit a packet to node devices 1 in each of levels 1 to 4 in the routing table by repeating Steps S2 to S4.

Next, the control unit 11 converts the ID mask to "4" by adding "1" to "3" to thereby regenerate the packet (Step S4). Then the process returns to the above-mentioned Step S2.

At this time, since the ID mask "4" is not smaller than the digit number of the routing table, the control unit 11 judges that the ID mask of the packet is not smaller than the digit number of the routing table (Step S2: NO), and finishes the operation (end).

(2) Information Transfer Process

Information transfer process by the node A will be explained with reference to FIG. 12. Here, a routing table retained (saved) by the node A is not shown.

The control unit 11 of the node A starts the information transfer process when a packet from the node X is received via the communication unit 20 or the like, on a premise that the own node device is working (in other words, power is turned on and various settings of the node X is initialized) (start). In the packet thus received, as shown in FIG. 7(B), the target node ID is "3102", the ID mask is "0", and the above-mentioned main information is included.

When the information transfer process is started, the control unit 11 judges whether or not the node ID of the node A is included in a target of the packet (Step S11). The target of the packet indicates node IDs having upper digits corresponding to ID mask values of target node IDs commonly included. For example, when an ID mask of a packet is "0", all the node IDs are included in the target of the packet, and when an ID mask of a packet is "2" and the target node ID of the packet is "3102", node IDs of "31**", namely the node IDs having upper two digits of "31", are included in the target of packet.

At this time, since the ID mask of the packet is "0" and valid digit number is not specified, the control unit 11 judges that the node ID "0132" of the node A is included in a target of the packet (Step S11: YES) and converts the target node ID of the packet to "0132" that is the own node ID (Step S12).

Then, the control unit 11 converts the ID mask of the packet to a value of "ID mask of the packet+1" (Step S13). Specifically, the control unit 11 converts the ID mask of the packet into "1" by adding 1 to "0", which is the ID mask of the packet, to thereby regenerate a packet.

Next, the control unit 11 judges whether or not the ID mask of the packet is smaller than a digit number of a routing table (digit number of node ID, all level number) (Step S14). At this time, since the ID mask "1" is smaller than the digit number "4" of the routing table, the control unit 11 judges that the ID mask of the packet is smaller than the digit number of the routing table (Step S14: YES), and transmits a packet thus generated to all the node devices 1, registered in a level of "ID mask of the packet+1" of the routing table (Step S15). Specifically, the control unit 11 transmits the packet to nodes A1, A2, and A3, which are node devices 1 in level 2, obtained by adding 1 to the ID mask "1" of the packet. Then the process returns to Step S13.

Thereafter, the control unit 11 repeats the Steps S13, S14, and S15 with respect to the ID masks "2" and "3" in a manner similar thereto. Thus, by repeating Steps S13 to S15, it becomes possible to transmit a packet to node devices 1 in each of levels 2 to 4 in the routing table.

Next, the control unit 11 converts the ID mask of a packet from "3" to "4" by adding 1 (Step S13) to thereby regenerate a packet.

At this time, since the ID mask "4" is not smaller than the digit number of the routing table, the control unit 11 judges that the ID mask of the packet is not smaller than the digit number of the routing table (Step S14: NO), carries out a process with a processing means corresponding to main information of the packet (Step S16), and finishes the operation (end).

On the other hand, when an ID mask of packet received by the node A is "2", and a target node ID thereof is "3102", the control unit 11 judges that the node ID "0132" of the node A is not included in the target of the packet "31" (Step S11: NO), transmits (transfers) the packet thus received to a node having character numbers, which match the top characters of the target node ID of the packet in the routing table (Step S17) as many characters as possible, and finishes the process (end). Here, the transfer process in Step S17** is to transfer a message by use of a routing table of an ordinary DHT.

[3.2 Operation of Information Communication System of Second Embodiment]

Next, a second embodiment of the information communication system S will be described with reference to FIGS. 13 to 16.

In the above-mentioned information communication system S of the first embodiment, each node device 1 transmits a packet (main information) only to a node device 1 having its IP address saved in a routing table in an information transmission process and an information transfer process. However, in the information communication system S of the second embodiment, a packet is transmitted to a node device 1 having a node ID having its IP address not being saved in a routing table when the information transmission process or the information transfer process is executed. The information communication system S of the second embodiment enables the main information to be transmitted to all the node devices to a upper limit extent even in an environment where participation and withdrawal into and from the system S occur frequently. Therefore, it becomes possible to transmit information to all the node devices 1 in the system more completely.

[3.2.1 Operation of the Entire Information Communication System]

First, operation of the entire information communication system of the second embodiment is almost similar to the first embodiment explained with reference to FIGS. 7 to 10. What is different between two embodiments is that in a routing table of one node device 1 (the above-mentioned node X), the node X transmits a packet to node IDs "311*", "3100", and "3101", which do not save IP addresses of other node device 1. Here, a direct transmission destination of a packet is other node device 1 having an IP address saved in it by a node device 1 on a transmission end. In case of transmitting a packet to a node device 1 having its IP address not being saved in a routing table, there is a possibility that the packet is kept to be transferred. Therefore, a transfer number upper limit value is included in the header part of the packet.

[3.2.2. Operation of Node Device]

Operation of a node device 1 in the second embodiment will be explained in detail by use of four flowcharts in FIGS. 13 to 16.

(1) Normal Information Transmission Process

A process performed by one node device 1 (above-mentioned node X) when the node X tries to transmit a packet including the main information to a node device 1 with its node ID specified will be described below as a normal information transmission process.

The control unit 11 of the node X starts the ordinary information transmission process when an instruction from the input unit 21, communication unit 20, or the like for transmitting certain information to one node device 1 (node ID: 2132) belonging to the information communication system S is received, on a premise that the node X is working (in other words, power is turned on and various settings of the node X is initialized) (start).

Figure 13:
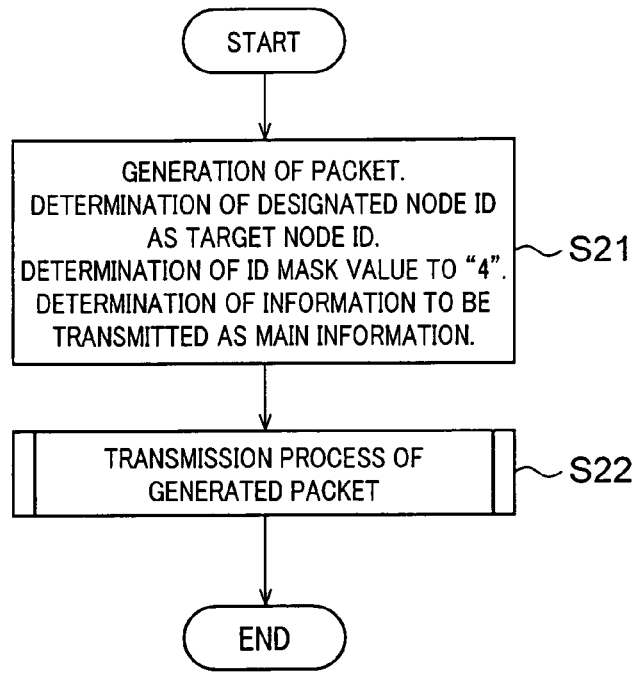
FIG. 13 is a flowchart showing an information transmission process in node device 1 according to a second embodiment.

As shown in FIG. 13, when the normal information transmission process is started, the control unit 11 generates a packet (Step S21). Specifically, the control unit 11 sets the target node ID of the packet to "2132" is node ID of the node X, sets an ID mask of the packet to "4", and generates a packet with the main information as information for transmission (refer to FIG. 6(B)).

Then, with regards to the packet thus generated, the control unit 11 performs a packet transmission process to be described later by use of FIG. 16 (Step S22), and finishes the process.

(2) Information Transmission Process to all the Node Devices in the System

A process performed by one node device 1 (above-mentioned node X) when the node X tries to transmit a packet including main information to all the node devices 1 participating in the system S will be described below as an information transmission process to thereby transmit a packet to all the node devices in the system.

The control unit 11 of the node X starts the ordinary information transmission process when an instruction from the input unit 21, a communication unit 20, or the like for transmitting certain information to all the node devices 1 belonging to the information communication system S is received, on a premise that the own node device is working (in other words, power is thrown in and various settings of the node X is initialized) (starting).

Figure 14:
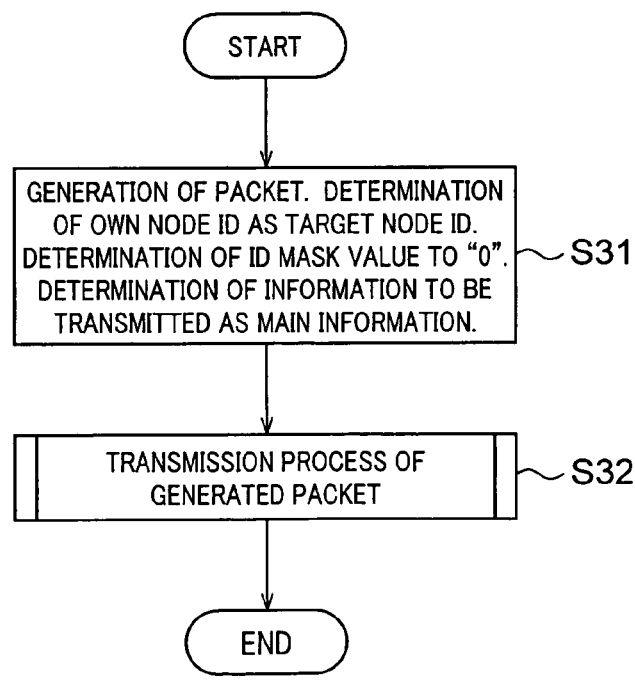
FIG. 14 is a flowchart showing an information transmission process to all the node devices 1 in a system according to the second embodiment.

As shown in FIG. 14, when the information transmission process for transmitting information to all the node devices in the system is started, the control unit 11 generates a packet (Step S31). Specifically, the control unit 11 sets up the target node ID of the packet to "3102", being node ID of the node X, sets up ID mask of the packet to "4", and generates a packet so that the main information of the packet becomes information required to be transmitted (vide FIG. 7(B)).

Then, with regards to the packet thus generated, the control unit 11 performs a packet transmission process described later by use of FIG. 16 (Step S32), and finishes the process.

(3) Information Receiving Process

A process performed when other node device 1 (for example, above-mentioned node A) receives a packet including main information from the above-mentioned node X will be described below as information receiving process.

The control unit 11 of the node X starts the information receiving process when a packet including main information (for example, target node ID "3102" and ID mask "0") is received via the communication unit 20 or the like, on a premise that the node A is working (in other words, power is thrown in, and various settings of the node X is initialized) (start).

Figure 15:
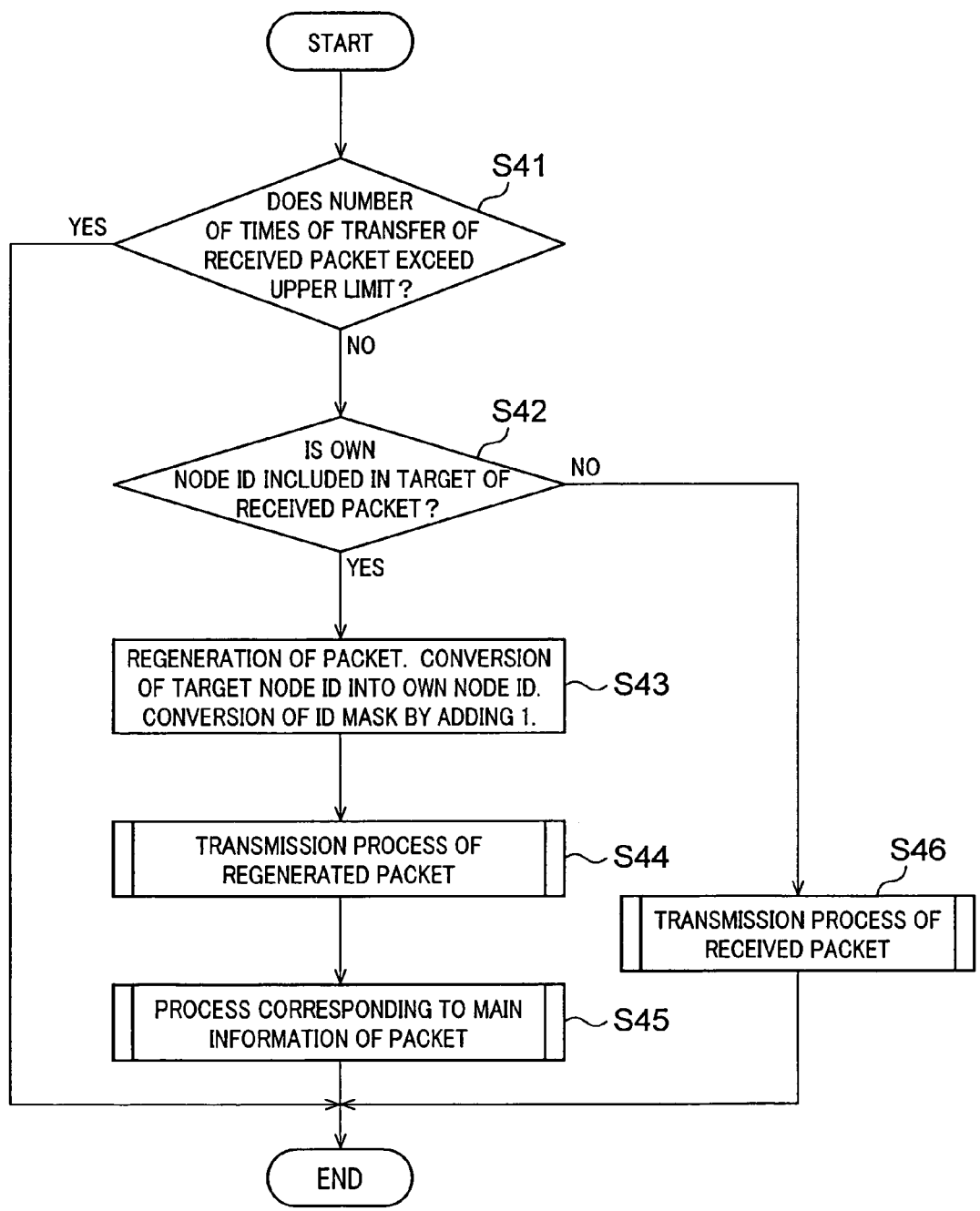
FIG. 15 is a flowchart showing an information transmission process in node device 1 according to the second embodiment.

As shown in FIG. 15, when the information receiving process is started, the control unit 11 judges whether or not the number of times of transferring the packet thus received exceeds a transfer number upper limit value (Step S41). Here, the transfer number upper limit value is information, included in a packet when a packet is transmitted to a node device 1 having its IP address not being saved by the node X, as described later. By this transfer number upper limit value, it is possible to prevent the packet from being kept to be transferred (by transfer number limiting means).

At this time, when the control unit 11 judges that the number of times the received packet is transferred does not exceed the transfer number upper limit value (Step S41: NO), the control unit 11 judges whether or not the node ID of the node X is included in a target of the packet thus received (Step S42). At this time, because the ID mask of the packet is "0" and all the node IDs are included, the control unit 11 judges that the node ID of the node X is included in the target of the packet thus received (Step S42: YES), converts the header part of the packet thus received to thereby regenerate a packet (Step S43). Specifically, the control unit 11 converts the target node ID of the packet to "0132", being the node ID of the node X, and converts the ID mask of the packet (=0) to "1", which is a value of "ID mask of a packet+1".

Then, the control unit 11 carries out a packet transmission process, described later by use of FIG. 16, with regard to the packet thus regenerated (Step S44), performs a process corresponding to main information in the packet with a processing means (Step S45), and finishes the process.

On the other hand, when it is judged that the number of times that the received packet is transferred exceeds the transfer number upper limit value in Step S41 (Step S41: YES), the process is finished without transferring the packet.

Moreover, in Step S42, when the control unit 11 judges that the node ID of the node X is not included in the target of the packet thus received (Step S42: NO), the control unit 11 carries out a packet transmission process, described later by use of FIG. 16 (Step S46), and finishes the process. Here, a case where the node ID of the own node device is not included in the target of the packet thus received, is for example when the target node ID of the packet is "3110", the ID mask is "3", and the node ID of the own node device is "0132". The target of the packet is a node device 1 that has a node ID with its top three characters being "311". Meanwhile, the own node ID "0132" is not included in the target.

(4) Packet Transmission Process

A packet transmission process carried out in each of processes (1) to (3) will be described by use of FIG. 16, as a process performed by a node device 1 (for example, above-mentioned node X).

Here, it is supposed that the node X retains (saves) a routing table shown in FIG. 5.

When the control unit 11 of the node device 1 starts a transmission process of a packet in the above-mentioned steps S22, S32, S44, and S46 (start), the control unit 11 determines a level specified by a routing table saved in the node device 1 as a value obtained by adding 1 to top characters of the node ID of the node device 1 and the target node ID of the packet which match each other (Step S51). For example, as explained in (2), in a case where the own node ID is "3102" and the target node ID is "3102", since all the characters match, number of matching characters is "4". By adding "1" thereto, a level of the routing table is determined to be "5".

Subsequently, the control unit 11 judges whether or not the level thus determined is larger than the ID mask of the packet (Step S52). In case of the above example, because the level "5" thus determined is larger than the ID mask of the packet "0", the control unit judges that the level thus determined is larger than the ID mask of the packet (Step S52: YES) and starts transmission process to all the node devices in the system S (multicast message transfer process).

The control unit 11 determines an area specified by the routing table, saved by the node device 1 (Step S53). The area to be specified is one row form the left end of a level having a value of "value of ID mask for packet+1" (digit number to be focused on is 0). Here, when the routing table made up of A character B-dyadic number, the value of the level is from 1 to (value of A) and the value of row is from 1 to (value of B) (digit number to be focused on is 0 to (B minus 1)). When it is 4-character quaternary as mentioned above, there are 1 to 4 levels (value of all levels (all-level number) is 4) and 1 to 4 rows (value of all rows (all-row number) is 4). In the above example, because ID mask of the packet is "0", "level 1, row 1" of the routing table is specified.

Subsequently, the control unit 11 judges whether or not value of the level is equal to or smaller than the value of all levels (all-level number) (Step S54). In the above example, because the value of the level "1" is the value of all levels "4" or less, the control unit 11 judges that the value of the level is equal to or smaller than the value of the all levels (Step S54: YES), and judges whether or not the specified area indicates the node ID of the node device 1 (Step S56).

In the above example, because the specified "level 1, row 1" does not indicate the own node ID, the control unit 11 judges that the specified area does not indicate the own node ID (Step S56: NO) and judges whether or not other node device is saved in the area thus specified (Step S57). In the above example, because an IP address of the node A is saved in the "level 1, row 1", the control unit 11 judges that other node device is saved in the area thus specified (Step S57: YES) and transmits a packet to the node device thus saved (Step S58).

Next, the control unit 11 adds 1 to a value of a row to be specified (Step S59). Then the process goes back to Step S55. In the above example, a row "1" is changed to a row "2". Then, steps S55 to S59 are repeated, the packet is transmitted to node B of "level 1, row 2" and node C of "level 1, row 3", the area to be specified is changed to "level 1, row 4", and the process goes back to Step S55.

Next, in Step S56 through Step S55, because the "level 1, row 4" thus specified indicates the own node ID, the control unit 11 judges that the specified area indicates the own node ID (Step S56: YES), carries out process in Step-S59 to thereby change an area to be specified to "level 1, row 5", and the process goes back to Step S55. Thus it is possible to transmit a packet to all the node devices 1, saved as level 1.

At this time, because a value of row "5" is not equal to or smaller than all rows value "4", the control unit 11 judges that the value of the level is not equal to or smaller than the all levels value (Step S55: NO), converts a value of ID mask of the packet to "value of ID mask+1" to thereby regenerate a packet (Step S60). Then the process goes back to Step S53. In the example above, the mask ID is set to be "1".

The control unit 11 sets an area to be specified to "level 2, row 1" in Step S53, repeats Steps S54, S55 to S59 to thereby transmit a packet to node D in "level 2, row 1", node E in "level 2, row 3", and node F in "level 2, row 4", and changes an area to be specified to "level 2, row 5". Thus, it is possible to transmit a packet to all the node devices 1, saved as level 2.

At this time, because the value of row "5" is not equal to or smaller than all rows value "4", the control unit 11 judges that the value of level is not equal to or smaller than all rows value (Step S55: NO), converts the ID mask value of packet to "ID mask value+1" to thereby regenerate a packet (Step S60). Then the process goes back to Step S53. In the above example, the mask ID is set to be "2".

The control unit 11 sets an area to be specified to "level 3 row 1" in Step S53, specifies "level 3, row 2" through Steps S54, S55; YES, S56; YES, and S59, and performs judgment in Step S57 through Step S55; YES, and S56; NO.

Because IP address of another node device 1 is not saved in the area "level 3, row 2" thus specified in the above example, the control unit 11 judges that other node device is saved in the area thus specified (Step S57: NO), and transmits a packet to another node device 1 where the IP address is saved nearest to the area "level 3, row 2" specified (Step S61).

Specifically in Step S61, the control unit 11 converts the ID mask value by adding 1 thereto, converts the target node ID to a node ID corresponding to the area, regenerates a packet by including the transfer number upper limit value information in the header part, and transmits the packet thus regenerated. In the above example, the ID mask value is set to be "3", the target node ID is set to be "3110" corresponding to "level 3, row 2" (underlined digit number that is not specified may be arbitrarily determined) (vide "X→empty" in FIG. 9(B)). By specifying a target in such a manner, when a node device 1 participates in this area, a packet can be transmitted. In the above example, the packet may be transmitted to a node G to be transferred.

Here, the transfer number upper limit value is a value for determining an upper limit of times a packet is transferred and is provided to prevent a packet from being transferred unlimitedly when a node device 1 to be a target does not exist. The transfer number upper limit value is a relatively large number so that the number does not exceed in an ordinary transfer process, and for example when a DHT of 4 characters is used, the transfer number upper limit value is set to be 8, 16, or the like. Ordinarily, number of times of transferring when a 4-character DHT is used is equal to or smaller than 4. Although it is not described in accordance with the following process, information indicative of how many times the packet is transferred is ordinarily included in a packet to be transferred.

Next, the control unit 11 goes back to process in Step S59, repeats Steps S55 to 59, transmits a packet to the node G in "level 3, row 3" and a node H in "level 3, row 4", and converts an area to be specified to "level 3, row 5". Thus, it is possible to transmit a packet to all the node devices 1, saved as level 3, and node devices 1 in an area which is not saved in level 3.

At this time, because the value of the row "5" is not equal to or smaller than all rows value "4", the control unit 11 judges that the value of the level is not equal to or smaller than all levels value (Step S55: NO), regenerates a packet (Step S60). Then the process goes back to Step S53. In the above example, the mask ID is set to be "3".

Subsequently, the control unit 11 repeats Steps S53, S54, S55 to 59, and S61 with regards to each area of level 4, transmits a packet to a node 1 in "level 4, row 4", and converts an area to be specified into "level 4, row 5" (Step S60). Thus, it is possible to transmit a packet to all the node devices 1 saved as level 4 and node devices 1 in an area where the level 4 is not saved.

Going back to Step S53, the control unit 11 sets an area to be specified to "level 5, row 1" and judges whether or not the value of the level is equal to or smaller than the all levels value (Step S54). In the above example, because a value of the level "5" is not equal to or smaller than the a value "4" of all levels, the control unit 11 judges that the value of the level is not equal to or smaller than the value of all levels (Step S54: NO). Then the process is finished.

On the other hand, in the above-mentioned Step S51, when the own node ID is "3102" as explained in (1), a target node ID is "2132" and an ID mask is "4", because no digit number matches at all, "0" is set and 1 is added thereto to thereby determine a level of the routing table to be "1".

Next, the control unit 11 judges whether or not the level thus determined is larger than the ID mask of the packet (Step S52). In case of the above example, because the level "1" thus determined is smaller than the ID mask of the packet "4", the control unit 11 judges that the level thus determined is not larger than the ID mask of the packet (Step S52: NO) and starts an ordinary DHT message transmission/transfer process.

The control unit 11 is a node device 1 closest to the target node ID in the level thus determined and determines what is saved in the routing table, and transmits (transfers) a packet to the node device 1 (Step S62). Then the process is finished. Here, the transfer process in Step S62 is to transfer a message by use of a routing table of a normal DHT.

[4. Modified Embodiment]

In each of the above-mentioned embodiments, a node device 1 which is a transmission destination is specified by use of a transmission group specification value (ID mask) and identification information (target node ID), and main information is transmitted to a representative of each group. However, the present invention is not limited to those embodiments. It is sufficient for a node device 1 to classify node devices 1 included in the system S into a plurality of groups in accordance with a predetermined rule, determine one node device 1 included in each of the groups, transmit main information to all the node devices 1 thus determined. Simultaneously when main information is received from another node device 1 and the destination of the main information is a group including the node device 1, it is sufficient to further classify the group, to which the node device 1 belongs, into a plurality of groups in conformity with the predetermined rule, to determine one node device 1 included in each of the group, and to transmit the main information thus received to all the node devices 1 thus determined.

In the above-mentioned each embodiment, as a predetermined rule in the present invention, a method of a distributed hash table (DHT) is used, a node device 1 specifies an area of the node device 1 and an area of other node device for each of a group brigade (each level) and a group (value of each of rows and attention characters), and each of IP addresses of other node devices is saved in a routing table. However, the present invention is not limited to the embodiment mentioned above. It is sufficient that in accordance with a predetermined rule, a node device 1 classifies node devices 1 included in the information communication system S into a plurality of groups, saves a group brigade including the group in first stage, further classifies a group to which the own node device belongs and is in the group brigade into a plurality of groups, saves a group brigade in the next stage including the groups, saves group brigades for a predetermined number of stages according to groups thus classifies, and memorizing destination information (IP address) indicative of destination of the own node device and other node device 1 while making the destination information correlate with each group. When a node device 1 classifies other node devices 1 for each stage to save them, it becomes possible to transmit and transfer main information and also possible to transmit main information to all the node devices in the system S or all the node devices included in a specific group. Here, a "stage" in the present invention is expressed as "level" in the embodiments and levels 1, 2, and the like correspond to the stages.

In each of the above-mentioned embodiments, as shown in FIGS. 6(A) to (D), a transmission group specification value (ID mask) and identification information (target node ID) are included in the header part of a packet. However, the present invention is not limited to such an embodiment. As long as a transmission group specification value and identification information are transmitted together with main information, the transmission group specification value and identification information may be added to the main information in any form. Moreover, a definition method of the transmission group specification value is not limited to the ones according to the above-mentioned embodiments, and any method is acceptable as long as a transmission destination group can be specified by a given rule, a transmission group specification value is converted in accordance with a given rule when main information is transferred or the like, and a node device 1, being a target, is specified.

In addition thereto, it is also possible to make a program corresponding to each operation of the above-mentioned node device 1 save in an information saving medium such as a flexible disc or a hard disc, or to be saved through a network such as the Internet for recording, and read out for execution by a computer or the like so that the computer is caused to function as the control unit 11 in accordance with each of the embodiments.

Figure 11:
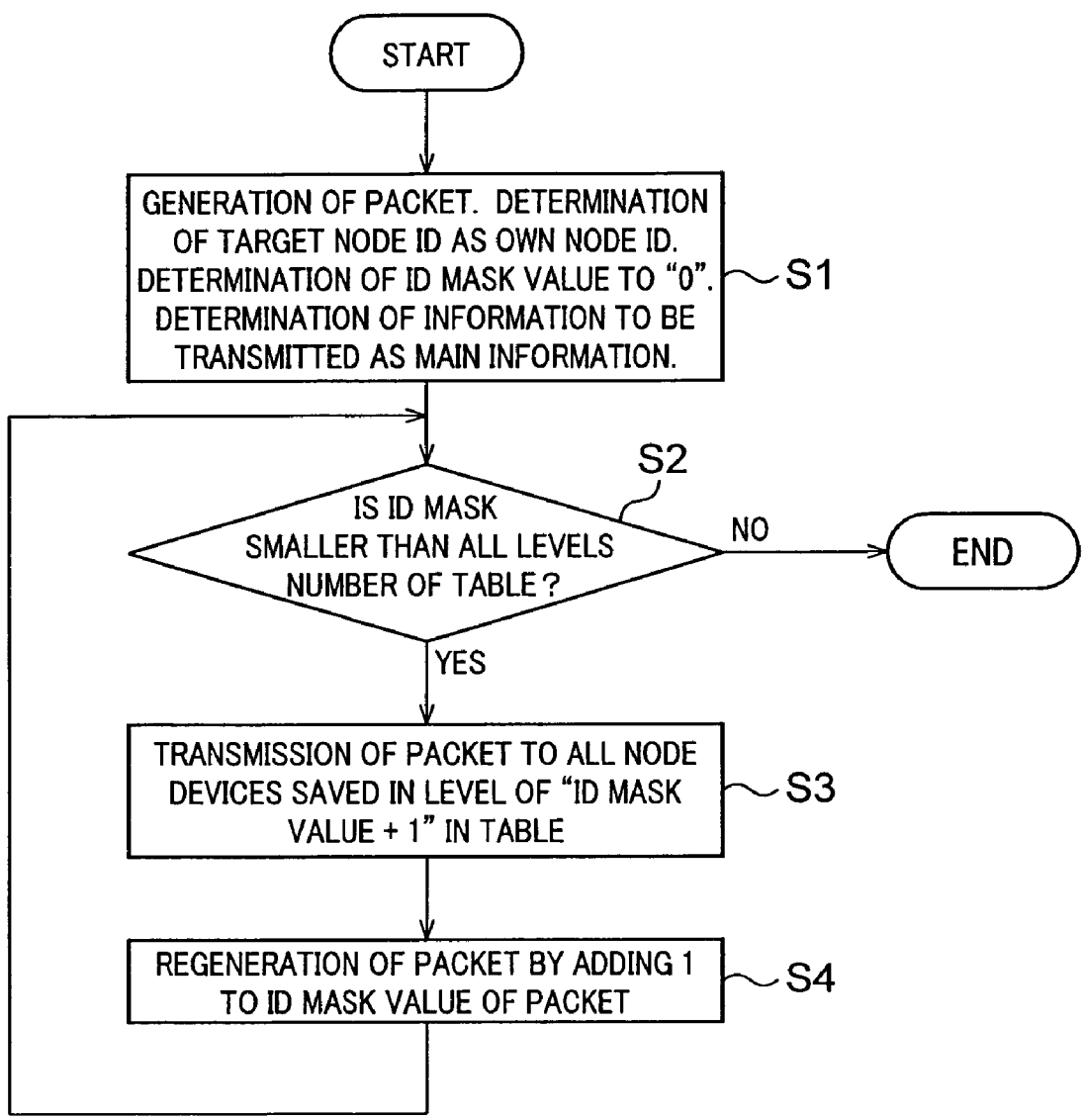
FIG. 11 is a flowchart showing an information transmission process in node device 1 according to a first embodiment.
Figure 12:
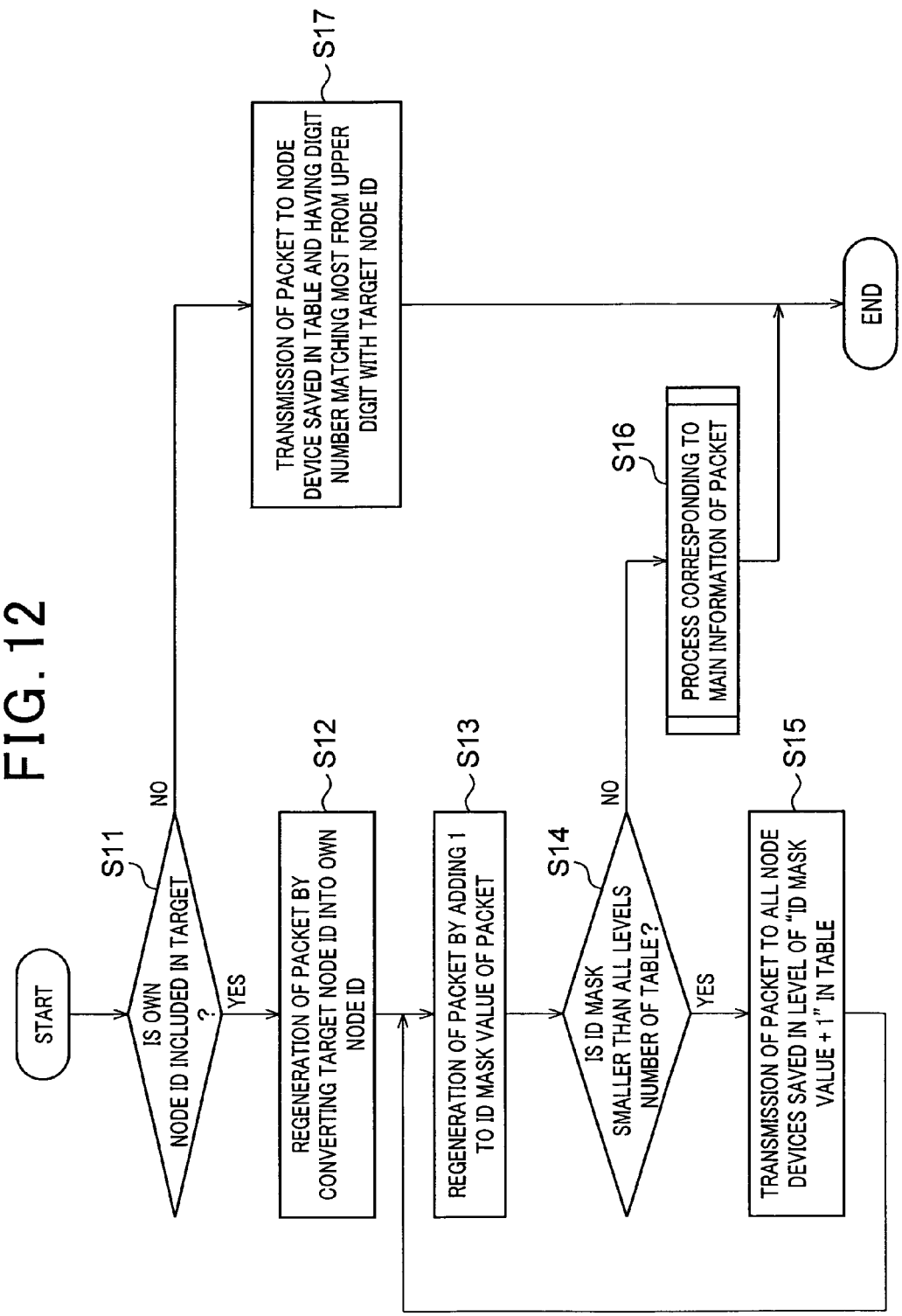
FIG. 12 is a flowchart showing an information transmission process in node device 1 according to the first embodiment.

Further, in the above embodiments, when an instruction to transmit certain information to all the node devices 1, belonging to the information communication system S. is received in FIG. 11, an information transmission process is started. However, when an instruction to transmit certain information to a specific group is received, an ID mask may be determined as a value indicative of a specific group in S1 in FIG. 11, and the following processes may be carried out. For example, when an instruction to transmit information in a node device 1 having a node ID is "3***" is received, the ID mask may be determined to be 1 in S1 of FIG. 11, and the following processes may be carried out.

The present invention is not confined to the configuration listed in the foregoing embodiments, but it is easily understood that the person skilled in the art can modify such configurations into various other modes, within the scope of the present invention described in the claims.

What is claimed is:

1. An information communication system formed by participation of a plurality of node devices mutually connected through a communication route,
one of the plurality of node devices comprising:
  a storing unit that stores address information indicating addresses of a part of node devices in the plurality of node devices, wherein the plurality of node devices are divided into a plurality of first groups in conformity with a first predetermined rule;
  a first determining unit that determines a first representative node device in the first groups, wherein the first representative node device is a representative of the node devices of a first group to which the first representative node device belongs; and
  an information transmitting unit that transmits information to be transmitted to the first representative node device determined by the first determining unit,
the first representative node device comprising:
  a receiving unit that receives the information transmitted by the information transmitting unit of another node device;
  a second determining unit that determines a second representative node device in second groups into which the first group including the first representative node device is further divided in conformity with a second predetermined rule, wherein the second representative node device is a representative of the node devices of a second group to which the second representative node device belongs; and
  an information transferring unit that transfers the main information received by the receiving unit to the second representative node device determined by the second determining unit,
wherein
  the information transmitting unit adds a transmission group specification value indicative of the first groups to the information, and transmits the information to which the transmission group specification value is added, to the first representative node device belonging to the first groups corresponding to the transmission group specification value; and
  the information transfer unit converts the transmission group specification value added to the information received by the receiving unit into a transmission group specification value indicative of the second groups, adds the converted transmission group specification value to the information, and transfers the information to which the converted transmission group specification value is added, to the second representative node device belonging to the second groups corresponding to the converted transmission group specification value, in response to determining that the transmission group specification value added to the information received by the receiving unit indicates bound for the first group including the first representative node device which receives the information by the receiving unit.

2. An information communication method in an information communication system formed by participation of a plurality of node devices mutually connected through a communication route, wherein address information indicating addresses of a part of node devices in the plurality of node devices is stored in a storing unit, and the plurality of node devices are divided into a plurality of first groups in conformity with a first predetermined rule, the method comprising:
  determining a first representative node device in the first groups, wherein the first representative node device is a representative of the node devices of a group to which the first representative node device belongs,
  adding a transmission group specification value indicative of the first groups to information to be transmitted to the determined first representative node device,
  transmitting the information to which the transmission group specification value is added, to the first representative node device belonging to the groups corresponding to the transmission group specification value;
  receiving the information transmitted by another node device;
  determining a second representative node device in second groups into which the first group including the first representative node device is further divided in conformity with a second predetermined rule, wherein the second representative node device is a representative of the node devices of a second group to which the second representative node device belongs;
  converting the transmission group specification value added to the received information into a transmission group specification value indicative of the second groups;
  adding the converted transmission group specification value to the received information; and
  transferring the information to which the converted transmission group specification value is added, to the determined second representative node device belonging to the second group corresponding to the converted transmission group specification value, in response to determining that the transmission group specification value added to the received information indicates bound for the first group including the first representative node device.

3. A node device included in an information communication system formed by participation of a plurality of node devices mutually connected through a communication route, comprising:
  a storing unit that stores address information indicating addresses of a part of node devices in the plurality of node devices, wherein the plurality of node devices are divided into a plurality of first groups in conformity with a first predetermined rule;
  a first determining unit that determines a first representative node device in the first groups, wherein the first representative node device is a representative of the node devices of a first group to which the first representative node device belongs;
  an information transmitting unit that transmits information to be transmitted to the first representative node device determined by the first determining unit,
  a receiving unit that receives the information transmitted by another node device;

a second determining unit that determines a second representative node device in second groups into which the first group including the node device which receives the information by the receiving unit is further divided in conformity with a second predetermined rule, wherein the second representative node device is a representative of the node devices of a second group to which the second representative node device belongs; and an information transferring unit that transfers the information received by the receiving unit to the second representative node device determined by the second determining unit, wherein the information transmitting unit adds a transmission group specification value indicative of the first groups to the information, and transmits the information to which the transmission group specification value is added, to the first representative node device belonging to the first groups corresponding to the transmission group specification value; and the information transfer unit converts a transmission group specification value added to the information received by the receiving unit into a transmission group specification value indicative of the second groups, adds the converted transmission group specification value to the information, and transfers the information to which the converted transmission group specification value is added, to the second representative node device belonging to the second groups corresponding to the converted transmission group specification value, in response to determining that the transmission group specification value added to the information received by the receiving unit indicates bound for the first group including the node device which receives the information by the receiving unit.

4. The node device according to claim 3, further comprising:

a third determining unit that determines a third representative node device, in response to determining based on the converted transmission group specification value, that the storing unit stores address information of a node device belonging to third groups into which the second group including the second representative node device is further divided in conformity with a third predetermined rule, wherein the third representative node device is a representative of the node devices of a third group to which the third representative node device belongs, wherein the information transfer unit transfers the information to which the converted transmission group specification value is added, to the third representative node device belonging to the third groups.

5. The node device according to claim 3, wherein the storing unit stores the address information of the part of node devices in the plurality of node devices by use of a distributed hash table as the predetermined rule.

6. The node device according to claim 3, wherein the information transmitting unit adds identification information corresponding to the transmission value specification value to the information, and transmits the information, the identification information being unique to a specific node device or identification information equivalent thereto, and the information transfer unit converts the identification information added to the received information into the identification information of the node device which receives the information by the receiving unit, adds the converted identification information to the information together with the converted transmission group specification value to the information, and transfers the information.

7. The node device according to claim 3, wherein at least either one of the information transmitting unit or the information transfer unit adds transfer number upper limit information, indicative of an upper limit number of times of transferring the information, to the information, transmits the main information to another node device, wherein the node device further comprising:

a processing unit that processes the information in response to determining that the group corresponding to the transmission group specification value added to the received information includes the node device which receives the information by the receiving unit; and a transfer number limiting unit that receives the information with the transfer number upper limit information added to the information, that recognizes number of times of transferring the received information in response to determining that the received information is not bound for the node device which receives the information by the receiving unit, and that transmits the information to another node device in response to determining that the recognized number of times of transferring is equal or less than an upper limit value corresponding to the transfer number upper limit information.

8. A non-transitory computer-readable storage medium that stores a computer-executable program for a node device included in an information communication system formed by participation of a plurality of node devices mutually connected through a communication route, wherein address information indicating addresses of a part of node devices in the plurality of node devices is stored in a storing unit, and the plurality of node devices are divided into a plurality of first groups in conformity with a first predetermined rule, the program comprising:

instructions for determining a first representative node device in the first groups, wherein the first representative node device is a representative of the node devices of a first group to which the first representative node device belongs, instructions for adding a transmission group specification value indicative of the first groups to information to be transmitted to the determined first representative node device, instructions for transmitting the information to which the transmission group specification value is added, to the first representative node device belonging to the groups corresponding to the transmission group specification value;

instructions for receiving the information transmitted by another node device;

instructions for determining a second representative node device in second groups into which the first group including the first representative node device is further divided in conformity with a second predetermined rule, wherein the second representative node device is a representative of the node devices of a second group to which the second representative node device belongs;

instructions for converting the transmission group specification value added to the received information into a transmission group specification value indicative of the second groups;

instructions for adding the converted transmission group specification value to the received information; and instructions for transferring the information to which the converted transmission group specification value is added, to the determined second representative node device belonging to the second group corresponding to the converted transmission group specification value, in response to determining that the transmission group specification value added to the received information indicates bound for the first group including the first representative node device.

9. A non-transitory computer-readable storage medium that stores a computer-executable program for a node device included in an information communication system formed by participation of a plurality of node devices mutually connected through a communication route, and the node device comprises a storing unit that stores address information indicating addresses of a part of node devices in the plurality of node devices, wherein the plurality of node devices are divided into a plurality of first groups, the program comprising:

instructions for adding a transmission group specification value indicative of the first groups to the information to be transmitted, instructions for determining a first representative node device in the first groups corresponding to the transmission group specification value, wherein the first representative node device is a representative of the node devices of a first group to which the first representative node device belongs;

instructions for transmitting the information to the determined first representative node device, instructions for converting the transmission group specification value added to the received information into a transmission group specification value indicative of second groups into which the first group including the first representative node device is further divided in conformity with a second predetermined rule, in response to determining a transmission group specification value added to information received from another node device indicates bound for the first group including the node device which receives the information;

instructions for adding the converted transmission group specification value to the information; and instructions for transmitting the information to a node device in the second groups corresponding to the converted transmission group specification value.

* * * * *

UNITED STATES PATENT AND TRADEMARK OFFICE
CERTIFICATE OF CORRECTION

PATENT NO. : 8,059,561 B2
APPLICATION NO. : 12/068332
DATED : November 15, 2011
INVENTOR(S) : Kentaro Ushiyama et al.

It is certified that error appears in the above-identified patent and that said Letters Patent is hereby corrected as shown below:

On the Title Page

Please delete the following:

Item "(73) Brother Kogyo Kabushiki Kaisha,
Nagoya (JP); Xing Co., Nagoya (JP)"

And replace with

(73) Brother Kogyo Kabushiki Kaisha,
Nagoya (JP); Xing Inc., Nagoya (JP)

Signed and Sealed this
Twenty-first Day of May, 2013

Teresa Stanek Rea
*Acting Director of the United States Patent and Trademark Office*